(12) United States Patent
Wolfson et al.

(10) Patent No.: US 12,426,615 B2
(45) Date of Patent: Sep. 30, 2025

(54) COMPOSITIONS COMPRISING CHOLINE AND OMEGA-3 FATTY ACID TO NUTRITIONALLY ENHANCE FOOD PRODUCTS

(71) Applicant: Ingenuity Foods, Inc., South San Francisco, CA (US)

(72) Inventors: Jonathan Wolfson, Portola Valley, CA (US); Mark Brooks, Corte Madera, CA (US); Katharine Noakes, San Francisco, CA (US)

(73) Assignee: Ingenuity Foods, Inc., South San Francisco, CA (US)

( * ) Notice: Subject to any disclaimer, the term of this patent is extended or adjusted under 35 U.S.C. 154(b) by 720 days.

(21) Appl. No.: 17/432,065

(22) PCT Filed: Feb. 21, 2020

(86) PCT No.: PCT/US2020/019354
§ 371 (c)(1),
(2) Date: Aug. 18, 2021

(87) PCT Pub. No.: WO2020/172623
PCT Pub. Date: Aug. 27, 2020

(65) Prior Publication Data
US 2022/0167652 A1    Jun. 2, 2022

Related U.S. Application Data

(60) Provisional application No. 62/928,285, filed on Oct. 30, 2019, provisional application No. 62/808,716, (Continued)

(51) Int. Cl.
*A23L 33/12*    (2016.01)
*A23C 9/13*    (2006.01)
(Continued)

(52) U.S. Cl.
CPC ............ *A23L 33/12* (2016.08); *A23C 9/1307* (2013.01); *A23C 9/1315* (2013.01);
(Continued)

(58) Field of Classification Search
CPC .......... A23L 3/22; A23L 33/135; A23L 19/09; A23L 33/12; A23C 9/1315; A23C 9/1322; A23C 9/1522; A23C 9/1528
See application file for complete search history.

(56) References Cited

U.S. PATENT DOCUMENTS 4,895,725 A    1/1990 Kantor et al.
6,153,653 A    11/2000 Shashoua
(Continued)

FOREIGN PATENT DOCUMENTS

CN    104187740 A  * 12/2014  ............... A23L 1/20
EP    0641562 A1    3/1995
(Continued)

OTHER PUBLICATIONS

"Best Sources of Choline". Available online from https://www.gbhealthwatch.com, pp. 1-5, available online as of Mar. 11, 2016 (Year: 2016).*
(Continued)

*Primary Examiner* — Jenna A Watts
(74) *Attorney, Agent, or Firm* — Weaver Austin Villeneuve & Sampson LLP

(57) ABSTRACT

Provided herein is a composition that includes choline or choline salt and omega-3 fatty acid for nutritionally enhancing a food product, as well as the resultant food products. The food product when nutritionally enhanced with the composition has an acceptable taste or acceptable odor or the food product has a peroxide value of less than 50 mEq. Methods of preparing the composition and food products are also are provided. As seen in the accompanying figure the
(Continued)

discoveries outlined herein have resulted in an unprecedented level of organoleptic stability over time, with no significant change to key sensory parameters typically seen in products that contain high levels of choline and omega-3 fatty acids.

13 Claims, 9 Drawing Sheets

Related U.S. Application Data filed on Feb. 21, 2019, provisional application No. 62/808,717, filed on Feb. 21, 2019.

(51) Int. Cl.
| | |
|---|---|
| *A23C 9/152* | (2006.01) |
| *A23C 9/156* | (2006.01) |
| *A23C 19/09* | (2006.01) |
| *A23L 9/10* | (2016.01) |
| *A23L 19/00* | (2016.01) |
| *A23L 33/135* | (2016.01) |
| *A23L 33/19* | (2016.01) |

(52) U.S. Cl.
CPC .......... *A23C 9/1322* (2013.01); *A23C 9/1522* (2013.01); *A23C 9/1526* (2013.01); *A23C 9/1528* (2013.01); *A23C 9/156* (2013.01); *A23C 19/0917* (2013.01); *A23C 19/0921* (2013.01); *A23L 9/12* (2016.08); *A23L 19/09* (2016.08); *A23L 33/135* (2016.08); *A23L 33/19* (2016.08); *A23V 2002/00* (2013.01)

(56) References Cited

U.S. PATENT DOCUMENTS

| | | | |
|---|---|---|---|
| 9,986,747 | B2 | 6/2018 | Taillan et al. |
| 2007/0048405 | A1 | 3/2007 | DeWille et al. |
| 2009/0162518 | A1 | 6/2009 | Clinger et al. |
| 2011/0028434 | A1 | 2/2011 | Destaillats et al. |
| 2012/0015070 | A1 | 1/2012 | Vanderkooi et al. |
| 2013/0115258 | A1 | 5/2013 | Singh et al. |
| 2014/0271998 | A1* | 9/2014 | Hecht .................. A23L 15/30 426/301 |
| 2015/0174080 | A1* | 6/2015 | Schiffrin ............... A61K 31/20 424/602 |
| 2016/0128367 | A1 | 5/2016 | Huntsman |
| 2016/0317600 | A1* | 11/2016 | Johns .................. A23L 33/18 |

FOREIGN PATENT DOCUMENTS

| | | |
|---|---|---|
| JP | H02103289 A | 4/1990 |
| JP | H07149664 A | 6/1995 |
| JP | 2000060424 A | 2/2000 |
| JP | 2011507518 A | 3/2011 |
| JP | 2012531914 A | 12/2012 |
| JP | 2015530981 A | 10/2015 |
| WO | WO-2008024906 A2 | 2/2008 |
| WO | WO-2009085388 A2 | 7/2009 |
| WO | WO-2010040789 A1 | 4/2010 |
| WO | WO-2011002802 A2 | 1/2011 |
| WO | WO-2014020004 A1 | 2/2014 |
| WO | WO-2015069678 A1 | 5/2015 |
| WO | WO-2016014514 A1 | 1/2016 |
| WO | WO-2017182299 A1 | 10/2017 |
| WO | WO-2018183251 A1 | 10/2018 |
| WO | WO-2018195601 A1 | 11/2018 |

OTHER PUBLICATIONS

"Best Sources of Omega-3". Available online from https://www.gbhealthwatch.com, pp. 1-5, available online as of Mar. 13, 2016. (Year: 2016).*
Machine translation of CN104187740 to Huang et al. Published Oct. 12, 2014, pp. 1-4. (Year: 2014).*
Costanzo, M. et al., "Krill Oil, Vitamin D and Lactobacillus Reuteri Cooperate to Reduce Gut Inflammation", Beneficial Microbes, Nov. 23, 2018, vol. 9, No. 3, pp. 389-399.
Dias D R et al., "Encapsulation As a Tool for Bioprocessing of Functional Foods," Current Opinion in Food Science, 2017, vol. 13, pp. 31-37.
Extended European Search Report dated Nov. 18, 2022 in EP Application No. EP20759524.
International Preliminary Report on Patentability dated Sep. 2, 2021, in Application No. PCT/US2020/019354.
International Search Report and Written Opinion dated May 4, 2020, in Application No. PCT/US2020/019354.
Lawless H., "The Sense of Smell in Food Quality and Sensory Evaluation," 1991, 28 pages.
Mcginley C M., et al., ""Odor Basics", Understanding and Using Odor Testing," 2000, 16 Pages.
Rajarethnem H T, et al., "Combined Supplementation of Choline and Docosahexaenoic Acid during Pregnancy Enhances Neurodevelopment of Fetal Hippocampus," Neurology Research International, 2017, 8748706, 10 Pages.
SG Search Report and Written Opinion dated Jan. 9, 2023 in Application No. SG11202109062T.
Siefarth C., et al., "Comparative Evaluation of Diagnostic Tools for Oxidative Deterioration of Polyunsaturated Fatty Acid-Enriched Infant Formulas during Storage," Foods, 2014, vol. 3, pp. 30-65.
Wurtman R J et al., "A Nutrient Combination that Can Affect Synapse Formation," Nutrients, 2014, vol. 6, pp. 1701-1710.
CN Office Action dated Dec. 26, 2023 in CN Application No. 202080030177.X, with English Translation.
JP Office Action dated Feb. 5, 2024 in Application No. JP2021-549451 with English Translation.
CN Office Action dated Oct. 31, 2024 in CN Application No. 202080030177.X, with English Translation.
JP Office Action dated Nov. 25, 2024 in JP Application No. 2021-549451, with English Translation.

* cited by examiner

COMPOSITIONS COMPRISING CHOLINE AND OMEGA-3 FATTY ACID TO NUTRITIONALLY ENHANCE FOOD PRODUCTS

CROSS-REFERENCE TO RELATED APPLICATIONS

This application claims the benefit of U.S. provisional application No. 62/808,716, filed Feb. 21, 2019; U.S. provisional application No. 62/808,717, filed Feb. 21, 2019; and U.S. provisional application No. 62/928,285, filed Oct. 30, 2019, each of which is hereby incorporated by reference in its entirety.

FIELD

The present disclosure relates to the field of human nutrition.

BACKGROUND

Recently, nutrition scientists have discovered that supplementing diets with choline and omega-3 fatty acids enhances neural development. It has been demonstrated that pups born from pregnant rodents supplemented with either choline alone or docosahexaenoic acid (DHA: an omega-3 fatty acid) alone showed significant ($p<0.05$) increases in the number of neural cells when compared to pups from control animals not supplemented with choline or DHA. Interestingly, pups that were supplemented with choline and DHA showed even significantly higher numbers of neuronal cells when compared to control animals ($p<0.001$). In addition, pups from dams supplemented with choline and/or DHA showed major improvement in memory performance. See Rajarethnem, et al., Neu Res Int, 2017, Article ID 8748706.

While benefits of supplementing diets with choline and omega-3 fatty acids have been demonstrated, foods supplemented with choline and/or omega-3 fatty acids often have unacceptable taste. Choline has an unpleasant taste often described as metallic, or sour. Omega-3 fatty acids usually have an unpleasant often described as fishy or rancid. DHA (commonly referred to as "fish oil"), is an omega-3 fatty acid with six double bonds that is highly susceptible to degradation. Degradation of the multiple double bonds produces oxidation products that are highly offensive in odor and taste. EPA is an omega-3 fatty acid with five double bonds that is also highly susceptible to degradation. Like DHA, degradation of the multiple double bonds produces oxidation products that are highly offensive in odor and taste. Alpha-linolenic Acid (ALA) is an omega-3 fatty acid with three double bonds that is also highly susceptible to degradation. Degradation of ALA produces oxidation products that are sometimes described as tasting rancid.

SUMMARY

Various embodiments contemplated herein may include, but need not be limited to, one or more of the following. (The cross-references below refer to embodiments in the same section as the referenced embodiment. Thus, in the section entitled "Embodiments Relating to Compositions Comprising Choline And Omega-3 Fatty Acid To Nutritionally Enhance Food Products," Embodiment 2 references the Embodiment 1 immediately above, and not to the Embodiment 1 in the section entitled "Embodiments Relating to Food Compositions Comprising Protein Nutritionally Enhanced With Choline And Omega-3 Fatty Acid.")

EMBODIMENTS RELATING TO FOOD COMPOSITIONS COMPRISING PROTEIN NUTRITIONALLY ENHANCED WITH CHOLINE AND OMEGA-3 FATTY ACID

Embodiment 1

A nutritionally enhanced food composition fortified with at least 0.25 mg/g choline salt, at least 0.25 mg/g omega-3 fatty acid, wherein the nutritionally enhanced food composition includes at least 25 mg/g protein, and wherein the nutritionally enhanced food composition has an acceptable taste or acceptable odor as determined by a sensory panel, or wherein the nutritionally enhanced food composition has a peroxide value of less than 50 mEq.

Embodiment 2

The nutritionally enhanced food composition of embodiment 1, wherein the level of oxidation of said omega-3 fatty acid is decreased as compared to a nutritionally enhanced food composition not comprising at least 0.25 mg/g choline salt, at least 0.25 mg/g omega-3 fatty acid, and at least 25 mg/g protein.

Embodiment 3

The nutritionally enhanced food composition of embodiment 1 or 2, wherein the peroxide value of the food composition is less than 50 mEq, less than 40 mEq, less than 35 mEq, less than 30 mEq, less than 25 mEq, less than 20 mEq, less than 15 mEq, less than 10 mEq, or less than 5 mEq.

Embodiment 4

The nutritionally enhanced food composition of any of embodiments 1-3, wherein the omega-3 fatty acid is selected from the group consisting of docosahexaenoic acid (DHA), eicosapentaenoic acid (EPA) and alpha-linolenic acid (ALA).

Embodiment 5

The nutritionally enhanced food composition of embodiment 4, wherein the nutritionally enhanced food composition includes DHA and ALA.

Embodiment 6

The nutritionally enhanced food composition of embodiment 4, wherein the nutritionally enhanced food composition includes DHA and EPA.

Embodiment 7

The nutritionally enhanced food composition of any of embodiments 1-6, wherein the nutritionally enhanced food composition includes 25-200 mg/g protein, 25-180 mg/g protein, 25-170 mg/g protein, 25-150 mg/g protein, 25-125 mg/g protein, 25-120 mg/g protein, 25-110 mg/g protein, 25-100 mg/g protein, 25-90 mg/g protein, 25-80 mg/g protein, 25-70 mg/g protein, 25-60 mg/g protein, or 25-50 mg/g protein.

Embodiment 8

The nutritionally enhanced food composition of any of embodiments 1-7, wherein the nutritionally enhanced food composition is fortified with an isolated protein.

Embodiment 9

The nutritionally enhanced food composition of embodiment 8, wherein the isolated protein is whole milk protein, casein, or whey.

Embodiment 10

The nutritionally enhanced food composition of embodiment 8, wherein the isolated protein is a vegetable protein selected from the group consisting of soy protein, pea protein, cottonseed protein, corn protein, and wheat protein.

Embodiment 11

The nutritionally enhanced food composition of any of embodiments 1-10, wherein the amount of the choline salt is between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g.

Embodiment 12

The nutritionally enhanced food composition of any of embodiments 1-11, wherein the amount of the omega-3 fatty acid is between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g.

Embodiment 13

The nutritionally enhanced food composition of any of embodiments 1-12, wherein the amount of choline salt is between 0.25 mg/g and 5 mg/g, the amount of DHA is between 0.25 mg/g and 5 mg/g, and/or the amount of ALA is between 0.25 mg/g and 5 mg/g.

Embodiment 14

The nutritionally enhanced food composition of any of embodiments 1-13, wherein when the nutritionally enhanced food composition is exposed to light at a temperature of between 0° C. and 25° C. for at least 2 weeks, the nutritionally enhanced food composition has an acceptable taste or acceptable odor, or wherein the nutritionally enhanced food composition has a peroxide value of less than 50 mEq.

Embodiment 15

The nutritionally enhanced food composition of embodiment 14, wherein when the nutritionally enhanced food composition is exposed to light for at least 4 weeks, at least 6 weeks, at least 8 weeks, at least 10 weeks, at least 12 weeks, at least 18 weeks, at least 24 weeks, or at least 52 weeks.

Embodiment 16

The nutritionally enhanced food composition of embodiment 14 or 15, wherein the nutritionally enhanced food composition is stored in a non-refrigerated container.

Embodiment 17

The nutritionally enhanced food composition of embodiment 14 or 15, wherein the nutritionally enhanced food composition is stored in a refrigerated container.

Embodiment 18

The nutritionally enhanced food composition of embodiment 17, wherein the refrigerated container is a lighted retail display case.

Embodiment 19

The nutritionally enhanced food composition of any of embodiments 1-18, wherein the nutritionally enhanced food composition has an acceptable taste or acceptable odor, and further wherein the nutritionally enhanced food composition has a reduced fishy taste, reduced metallic taste, or reduced rancid taste as compared to a food composition that is not nutritionally enhanced with a choline salt and omega-3 fatty acid.

Embodiment 20

The nutritionally enhanced food composition of any of embodiments 1-18, wherein the nutritionally enhanced food composition has an acceptable odor, and further wherein the nutritionally enhanced food composition has a reduced vegetable odor, fruity odor, floral odor, medicinal odor, chemical odor, fishy odor, offensive odor, painty odor or earthy odor as compared to a food composition that is not fortified with a choline salt and omega-3 fatty acid.

Embodiment 21

The nutritionally enhanced food composition of any of embodiments 1-19, wherein the choline salt is selected from the group consisting of choline acetate, choline bicarbonate, choline chloride, choline citrate, choline bitartrate and choline lactate.

Embodiment 22

The nutritionally enhanced food composition of any of embodiments 1-21, wherein the choline salt is choline chloride.

Embodiment 23

The nutritionally enhanced food composition of any of embodiment 1-22, wherein the nutritionally enhanced food composition is a dairy product.

Embodiment 24

The nutritionally enhanced food composition of embodiment 23, wherein the dairy product is whole milk, reduced fat milk, flavored milk, flavored milk beverage, meal replacement beverage, protein shake, yogurt based smoothie, yogurt, cheese, cheese product, liquid creamer, powdered creamer, probiotic shot, pudding, desert, dip, dressing, sauce, or condiment.

Embodiment 25

The nutritionally enhanced food composition of any of embodiment 24, wherein the nutritionally enhanced food composition is a beverage.

Embodiment 26

The nutritionally enhanced food composition of any of embodiment 1-24, wherein the nutritionally enhanced food composition is fresh, frozen or shelf-stable.

Embodiment 27

The nutritionally enhanced food composition of embodiment 26, wherein the nutritionally enhanced food composition is a frozen food.

Embodiment 28

The nutritionally enhanced food composition of embodiment 27, wherein the frozen food is ice cream, soft serve ice cream, ice cream novelties, frozen desert, frozen yogurt, popsicle, frozen entree, frozen prepared foods, frozen dinner, frozen lunch and frozen breakfast.

Embodiment 29

The nutritionally enhanced food composition of any of embodiment 1-28, wherein the nutritionally enhanced food composition is a retorted food or a canned food.

Embodiment 30

The nutritionally enhanced food composition of any of embodiments 1-29, wherein the nutritionally enhanced food composition includes a probiotic or an active culture.

Embodiment 31

The nutritionally enhanced food composition of embodiment 30, wherein the probiotic or active culture includes *Lactobacillus, Bifidobacterium. Saccharomyces, Enterococcus, Streptococcus. Pediococcus, Leuconostoc*, or *Bacillus*.

Embodiment 32

The nutritionally enhanced food composition of any of embodiments 1-31, wherein the nutritionally enhanced food composition is packaged in a non-photo protective packaging material.

Embodiment 33

The nutritionally enhanced food composition of embodiment 32, wherein the non-photo protective packaging material includes polylactic acid (PLA), polyethylene terephthalate (PET), polystyrene, or polypropylene.

Embodiment 34

A method of preparing a nutritionally enhanced food composition, the method including the steps of (a) providing at least one edible food ingredient; (b) combining choline salt and omega-3-fatty acid with the at least one edible ingredient to prepare the nutritionally enhanced food composition, wherein the nutritionally enhanced food composition includes at least 0.25 mg/g choline salt, at least 0.25 mg/g omega-3 fatty acid, and at least 25 mg/g protein; wherein the nutritionally enhanced food composition has an acceptable taste or acceptable odor as determined by a sensory panel, or wherein the nutritionally enhanced food composition has a peroxide value of less than 50 mEq.

Embodiment 35

The method of embodiment 34, wherein the choline salt is combined with the at least one edible food ingredient before the omega-3-fatty acid is combined with the at least one edible food ingredient.

Embodiment 36

The method of embodiment 34, wherein the omega-3-fatty acid is combined with the at least one edible food ingredient before the choline salt is combined with the at least one edible food ingredient.

Embodiment 37

The method of embodiment 34, wherein the choline salt and the omega-3-fatty acid are combined simultaneously with the at least one edible food ingredient.

Embodiment 38

The method of any of embodiments 34-37, the method further including the step of adding an isolated protein.

Embodiment 39

The method of embodiment 38, wherein the isolated protein is whole milk protein, casein, or whey.

Embodiment 40

The method of embodiment 38, wherein the isolated protein is a vegetable protein selected from the group consisting of soy protein, pea protein, cottonseed protein, corn protein, and wheat protein.

Embodiment 41

The method of any of embodiments 34-40, wherein the amount of the choline salt is between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g.

Embodiment 42

The method of any of embodiments 34-41, wherein the amount of the omega-3 fatty acid is between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g.

Embodiment 43

The method of any of embodiments 34-42, wherein the at least one edible food ingredient includes protein in an amount sufficient to provide a protein concentration of at least 25 mg/g, 25-200 mg/g, 25-180 mg/g, 25-170 mg/g, 25-150 mg/g, 25-125 mg/g, 25-120 mg/g, 25-110 mg/g, 25-100 mg/g, 25-90 mg/g, 25-80 mg/g, 25-70 mg/g, 25-60 mg/g, or 25-500 mg/g of the nutritionally enhanced food composition.

Embodiment 44

The method of embodiment 43, wherein the method includes adding an isolated protein selected from the group consisting of whole milk protein, casein, or whey, soy protein, pea protein, cottonseed protein, corn protein, and wheat protein.

Embodiment 45

The method of embodiment 44, wherein the isolated protein is whey.

Embodiment 46

The method of any of embodiments 34-43, further including the step of packaging the nutritionally enhanced food composition in non-photo protective packaging material.

Embodiment 47

The method of embodiment 46, wherein the non-photo protective packaging material includes polylactic acid (PLA), polyethylene terephthalate (PET), polystyrene or polypropylene.

Embodiment 48

The method of any of embodiments 34-43, wherein the method further includes the steps of mixing, blending, chopping, whipping, kneading, folding, heating, cooling, or freezing.

Embodiment 49

A method of reducing the oxidation of an omega-3 fatty acid in a nutritionally enhanced food composition, the method including the steps of fortifying a food composition with choline salt and omega-3 fatty acid, wherein the nutritionally enhanced food composition includes at least 0.25 mg/g choline salt, at least 0.25 mg/g omega-3 fatty acid, and at least 25 mg/g protein, and wherein the nutritionally enhanced food composition has an acceptable taste or acceptable odor as determined by a sensory panel, or wherein the nutritionally enhanced food composition has a peroxide value of less than 50 mEq.

Embodiment 50

The method of embodiment 49, wherein the level of oxidation of said omega-3 fatty acid is decreased as compared to a food composition that is not fortified with choline salt and omega-3-fatty acid.

Embodiment 51

The method of embodiment 49 or 50, wherein the peroxide value of the food composition is less than 50 mEq, less than 40 mEq, less than 35 mEq, less than 30 mEq, less than 25 mEq, less than 20 mEq, less than 15 mEq, less than 10 mEq, or less than 5 mEq.

Embodiment 52

The method of any of embodiments 49-51, wherein the omega-3 fatty acid is selected from the group consisting of docosahexaenoic acid (DHA), eicosapentaenoic acid (EPA), and alpha-linolenic acid (ALA).

Embodiment 53

The method of embodiment 52, wherein, the nutritionally enhanced food composition includes DHA and ALA.

Embodiment 54

The method of embodiment 52, wherein, the nutritionally enhanced food composition includes EPA and ALA.

Embodiment 55

The method of any of embodiments 49-54, wherein the nutritionally enhanced food composition includes 25-200 mg/g protein, 25-180 mg/g protein, 25-170 mg/g protein, 25-150 mg/g protein, 25-125 mg/g protein, 25-120 mg/g protein, 25-110 mg/g protein, 25-100 mg/g protein, 25-90 mg/g protein, 25-80 mg/g protein, 25-70 mg/g protein, 25-60 mg/g protein, or 25-50 mg/g protein.

Embodiment 56

The method of any of embodiments 49-55, wherein the nutritionally enhanced food composition is fortified with an isolated protein.

Embodiment 57

The method of embodiment 56, wherein the isolated protein is whole milk protein, casein, or whey.

Embodiment 58

The method of embodiment 57, wherein the isolated protein is a vegetable protein selected from the group consisting of soy protein, pea protein, cottonseed protein, corn protein, and wheat protein.

Embodiment 59

The method of any of embodiments 49-58, wherein the amount of the choline salt is between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g.

Embodiment 60

The method of any of embodiments 49-59, wherein the amount of the omega-3 fatty acid is between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g.

Embodiment 61

The method of any of embodiments 49-60, wherein the amount of choline salt is between 0.25 mg/g and 5 mg/g, the amount of DHA is between 0.25 mg/g and 5 mg/g, and/or the amount of ALA is between 0.25 mg/g and 5 mg/g.

Embodiment 62

The method of any of embodiments 49-61, wherein when the nutritionally enhanced food composition is exposed to light at a temperature of between 0° C. and 25° C. for at least 2 weeks, the nutritionally enhanced food composition has an acceptable taste or acceptable odor, or wherein the nutritionally enhanced food composition has a peroxide value of less than 50 mEq.

Embodiment 63

The method of embodiment 62, wherein when the nutritionally enhanced food composition is exposed to light for at least 4 weeks, at least 6 weeks, at least 8 weeks, at least 10 weeks, at least 12 weeks, at least 18 weeks, at least 24 weeks, or at least 52 weeks.

Embodiment 64

The method of embodiment 62 or 63, wherein the nutritionally enhanced food composition is stored in a non-refrigerated container.

Embodiment 65

The method of embodiment 62 or 63, wherein the nutritionally enhanced food composition is stored in a refrigerated container.

Embodiment 66

The method of embodiment 65, wherein the refrigerated container is a lighted retail display case.

Embodiment 67

The method of any of embodiments 49-66, wherein the nutritionally enhanced food composition has an acceptable taste or acceptable odor, and further wherein the nutritionally enhanced food composition has a reduced fishy taste, reduced metallic taste or reduced rancid taste as compared to a food composition that is not nutritionally enhanced with a choline salt and omega-3 fatty acid.

Embodiment 68

The method of any of embodiments 49-67 wherein the nutritionally enhanced food composition has an acceptable odor, and further wherein the nutritionally enhanced food composition has a reduced vegetable odor, fruity odor, floral odor, medicinal odor, chemical odor, fishy odor, offensive odor, painty odor or earthy odor as compared to a food composition that is not fortified with a choline salt and omega-3 fatty acid.

Embodiment 69

The method of any of embodiments 49-68, wherein the choline salt is selected from the group consisting of choline acetate, choline bicarbonate, choline chloride, choline citrate, choline bitartrate and choline lactate.

Embodiment 70

The method of any of embodiments 49-69, wherein the choline salt is choline chloride.

Embodiment 71

The method of any of embodiment 49-70, wherein the nutritionally enhanced food composition is a dairy product.

Embodiment 72

The method of embodiment 71, wherein the dairy product is whole milk, reduced fat milk, flavored milk, flavored milk beverage, meal replacement beverage, protein shake, yogurt based smoothie, yogurt, cheese, cheese product, liquid creamer, powdered creamer, probiotic shot, pudding, desert, dip, dressing, sauce, or condiment.

Embodiment 73

The method of any of embodiment 72, wherein the nutritionally enhanced food composition is a beverage.

Embodiment 74

The method of any of embodiment 49-73, wherein the nutritionally enhanced food composition is fresh, frozen, or shelf-stable.

Embodiment 75

The method of embodiment 74, wherein the nutritionally enhanced food composition is a frozen food.

Embodiment 76

The method of embodiment 75, wherein the frozen food is ice cream, soft serve ice cream, ice cream novelties, frozen desert, frozen yogurt, popsicle, frozen entree, frozen prepared foods, frozen dinner, frozen lunch and frozen breakfast.

Embodiment 77

The method of any of embodiment 49-76, wherein the nutritionally enhanced food composition is a retorted food or a canned food.

Embodiment 78

The method of any of embodiments 49-77, wherein the nutritionally enhanced food composition includes a probiotic or an active culture.

Embodiment 79

The method of embodiment 78, wherein the probiotic or active culture includes *Lactobacillus, Bifidobacterium, Saccharomyces, Enterococcus, Streptococcus, Pediococcus, Leuconostoc,* or *Bacillus*.

Embodiment 80

The method of any of embodiments 49-79, wherein the nutritionally enhanced food composition is packaged in a non-photo protective packaging material.

Embodiment 81

The method of embodiment 80, wherein the non-photo protective packaging material includes polylactic acid (PLA), polyethylene terephthalate (PET), polystyrene, or polypropylene.

EMBODIMENTS RELATING TO COMPOSITIONS COMPRISING CHOLINE AND OMEGA-3 FATTY ADD TO NUTRITIONALLY ENHANCE FOOD PRODUCTS

Embodiment 1

A composition for nutritionally enhancing a food product, the composition including choline salt and omega-3 fatty acid, wherein when the food product is nutritionally enhanced with said composition, the food product has an acceptable taste or acceptable odor as determined by a sensory panel, or wherein the food product has a peroxide value of less than 50 mEq.

Embodiment 2

The composition of embodiment 1, wherein the food product includes at least 25 mg protein per gram of food product.

Embodiment 3

The composition of embodiment 1 or 2, wherein the composition is added in a sufficient amount to produce a food product that includes at least 0.25 mg choline salt per gram of food product and at least 0.25 mg omega-3 fatty acid per gram of food product.

Embodiment 4

The composition of any of embodiments 1-3, wherein the level of oxidation of said omega-3 fatty acid in the food product is decreased as compared to a nutritionally enhanced food composition not comprising at least 0.25 mg/g choline salt, at least 0.25 mg/g omega-3 fatty acid, and at least 25 mg/g protein.

Embodiment 5

The composition of any of embodiments 1-4, wherein the peroxide value of the food product is less than 50 mEq, less than 40 mEq, less than 35 mEq, less than 30 mEq, less than 25 mEq, less than 20 mEq, less than 15 mEq, less than 10 mEq, or less than 5 mEq.

Embodiment 6

The composition of any of embodiments 1-5, wherein the omega-3 fatty acid is selected from the group consisting of docosahexaenoic acid (DHA), eicosapentaenoic acid (EPA), and alpha-linolenic acid (ALA).

Embodiment 7

The composition of embodiment 6, wherein the composition includes DHA and ALA.

Embodiment 8

The composition of embodiment 6, wherein the composition includes EPA and ALA.

Embodiment 9

The composition of any of embodiments 1-8, wherein the food product includes 25-200 mg/g protein, 25-180 mg/g protein, 25-170 mg/g protein, 25-150 mg/g protein, 25-125 mg/g protein, 25-120 mg/g protein, 25-110 mg/g protein, 25-100 mg/g protein, 25-90 mg/g protein, 25-80 mg/g protein, 25-70 mg/g protein, 25-60 mg/g protein, or 25-50 mg/g protein.

Embodiment 10

The composition of any of embodiments 1-9, wherein the food product is nutritionally enhanced with an isolated protein.

Embodiment 11

The composition of embodiment 10, wherein the isolated protein is whole milk protein, casein, or whey.

Embodiment 12

The composition of embodiment 10, wherein the isolated protein is a vegetable protein selected from the group consisting of soy protein, pea protein, cottonseed protein, corn protein, and wheat protein.

Embodiment 13

The composition of any of embodiments 1-12, wherein the amount of the choline salt is sufficient to prepare a food product that includes choline salt at a concentration of between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g food product.

Embodiment 14

The composition of any of embodiments 1-13, wherein the amount of choline salt is sufficient to prepare a food product that includes choline salt at a concentration of between 0.25 mg/g and 5 mg/g, the amount of DHA is between 0.25 mg/g and 5 mg/g, and/or the amount of ALA is between 0.25 mg/g and 5 mg/g food product.

Embodiment 15

The composition of any of embodiments 1-14, wherein when the food product is exposed to light at a temperature of between 0° C. and 25° C. for at least 2 weeks, the food product has an acceptable taste or acceptable odor, or wherein the food product has a peroxide value of less than 50 mEq.

Embodiment 16

The composition of embodiment 15, wherein when the food product is exposed to light for at least 4 weeks, at least 6 weeks, at least 8 weeks, at least 10 weeks, at least 12 weeks, at least 18 weeks, at least 24 weeks, or at least 52 weeks.

Embodiment 17

The composition of embodiment 15 or 16, wherein the food product is stored in a non-refrigerated container.

Embodiment 18

The composition of embodiment 15 or 16, wherein the food product is stored in a refrigerated container.

Embodiment 19

The composition of embodiment 18, wherein the refrigerated container is a lighted retail display case.

Embodiment 20

The composition of any of embodiments 1-19, wherein the food product has an acceptable taste or acceptable odor, and further wherein the nutritionally enhanced food product has a reduced fishy taste, reduced metallic taste, or reduced rancid taste as compared to a food product that is not nutritionally enhanced with said composition.

Embodiment 21

The composition of any of embodiments 1-19, wherein the food product has an acceptable odor, and further wherein the food product has a reduced vegetable odor, fruity odor, floral odor, medicinal odor, chemical odor, fishy odor, offensive odor, painty odor, or earthy odor as compared to a food product that is not nutritionally enhanced with said composition.

Embodiment 22

The composition of any of embodiments 1-21, wherein the choline salt is selected from the group consisting of choline acetate, choline bicarbonate, choline chloride, choline citrate, choline bitartrate and choline lactate.

Embodiment 23

The composition of embodiment 22, wherein the choline salt is choline chloride.

Embodiment 24

The composition of any of embodiments 1-23, wherein the food product is a dairy product.

Embodiment 25

The composition of embodiment 24, wherein the dairy product is whole milk, reduced fat milk, flavored milk, flavored milk beverage, meal replacement beverage, protein shake, yogurt based smoothie, yogurt, cheese, cheese product, liquid creamer, powdered creamer, probiotic shot, pudding, desert, dip, dressing, sauce, or condiment.

Embodiment 26

The composition of any of embodiments 1-24, wherein the food product is a beverage.

Embodiment 27

The composition of any of embodiment 1-26, wherein the food product is fresh, frozen, or shelf-stable.

Embodiment 28

A method of preparing a composition for nutritionally enhancing a food product, the method including the steps of combining a choline salt, an omega-3-fatty acid, and an ingredient including protein or an isolated protein; wherein when the food product is nutritionally enhanced with said composition, the food product has an acceptable taste or acceptable odor as determined by a sensory panel, or wherein the food product has a peroxide value of less than 50 mEq.

Embodiment 29

The method of embodiment 28, wherein: (a) the choline salt is first combined with the omega-3-fatty acid to prepare a choline salt/omega-3 fatty acid formulation, and (b) the choline salt/omega-3 fatty acid formulation is combined with the ingredient including protein or an isolated protein.

Embodiment 30

The method of embodiment 28 or 29, wherein the choline salt, the omega-3 fatty acid, and the ingredient including protein or an isolated protein, are combined simultaneously.

FRUIT OR VEGETABLE COMPOSITIONS COMPRISING CHOLINE AND OMEGA-3 FATTY ACID TO NUTRITIONALLY ENHANCE FOOD PRODUCTS

Embodiment 1

A method of preparing a fruit or vegetable preparation, the fruit or vegetable preparation including 100 mg/100 g to 1000 mg/100 g omega-3 fatty acid and 50 mg/100 g to 500 mg/100 g choline, the method including the steps of: (a) providing a base fruit or vegetable puree; (b) combining choline and omega-3-fatty acid with the base fruit or vegetable puree to prepare puree A; (c) subjecting puree A to a temperature of between 65° C. to 100° C. for a period of between 1 second to 30 minutes to prepare a fruit or vegetable preparation; and (d) cooling the fruit or vegetable preparation to ambient temperature, wherein the fruit of vegetable preparation has an acceptable appearance, aroma, flavor or texture as determined by a sensory panel, or wherein the fruit or vegetable preparation has a peroxide value of less than 50 mEq.

Embodiment 2

The method of embodiment 1, wherein the omega-3 fatty acid is encapsulated.

Embodiment 3

The method of embodiment 2, wherein the omega-3 fatty acid is encapsulated by unmodified polysaccharide, modified polysaccharide, or gelatin.

Embodiment 4

The method of any of embodiments 1 to 3, wherein the unmodified polysaccharide or modified polysaccharide is selected from the group consisting of agar, carageenen, maltodextrin, corn syrup solids, pectin, xanthan gum, gellan, monosaccharide, and disaccharide.

Embodiment 5

The method of any of embodiments 1 to 4, wherein the omega-3 fatty acid is selected from the group consisting of docosahexaenoic acid (DHA), eicosapentaenoic acid (EPA), and alpha-linolenic acid (ALA).

Embodiment 6

The method of any of embodiments 1 to 5, wherein the fruit or vegetable preparation includes between 100 mg/100 g to 750 mg/100 g omega-3 fatty acid, between 100 mg/100 g to 500 mg/100 g omega-3 fatty acid, between 100 mg/100 g to 400 mg/100 g omega-3 fatty acid, between 150 mg/100 g to 400 mg/100 g, between 150 mg/100 g to 350 mg/100 g, between 200 mg/100 g to 350 mg/100 g, or between 200 mg/100 g to 300 mg/100 g omega-3 fatty acid.

Embodiment 7

The method of any of embodiments 1 to 6, wherein choline is a choline salt.

Embodiment 8

The method of embodiment 7, wherein the choline salt is choline chloride.

Embodiment 9

The method of any of embodiments 1 to 8, wherein the fruit or vegetable preparation includes between 50 mg/100 g to 400 mg/100 g choline, between 50 mg/100 g to 350 mg/100 g choline, between 50 mg/100 g to 300 mg/100 g choline, between 50 mg/100 g to 250 mg/100 g choline, between 50 mg/100 g to 200 mg/100 g choline, between 75 mg/100 g to 250 mg/100 g choline, between 75 mg/100 g to 200 mg/100 g choline, between 100 mg/100 g to 200 mg/100 g choline, or between 100 mg/100 g to 200 mg/100 g choline.

Embodiment 10

The method of any of embodiments 1 to 9, wherein the fruit or vegetable preparation has acceptable appearance, aroma, flavor and texture after exposure to a temperature of between 30° C. to 50° C. for a period of between 9 to 52 weeks.

Embodiment 11

The method of embodiment 10, wherein the fruit or vegetable preparation has acceptable appearance, aroma, flavor and texture after exposure to a temperature of between 10° C. to 50° C. for a period of between 9 to 48 weeks.

Embodiment 12

The method of embodiment 10, wherein the fruit or vegetable preparation has acceptable appearance, aroma, flavor and texture after exposure to a temperature of between 10° C. to 50° C. for a period of between 9 to 26 weeks.

Embodiment 13

The method of any of embodiments 1 to 12, wherein the peroxide value of the fruit or vegetable preparation is less than 40 mEq, less than 35 mEq, less than 30 mEq, less than 25 mEq, less than 20 mEq, less than 15 mEq, less than 10 mEq, or less than 5 mEq.

Embodiment 14

The method of any of embodiments 1 to 13, wherein the method further includes adding a thickening or gelling agent to the fruit or vegetable preparation.

Embodiment 15

The method of embodiment 14, wherein the thickening agent is an unmodified starch or a modified starch.

Embodiment 16

The method of any of embodiments 1 to 15, wherein the method further includes adding a sweetener to the fruit or vegetable preparation.

Embodiment 17

The method of embodiment 16, wherein the sweetener is selected from the group consisting of sucrose, glucose, fructose, corn syrup, monk fruit extract, sucromalt, allulose, agave, honey, maple syrup, erythritol, maltitol, sorbitol, mannitol, xylitol, xylose, stevia/rebaudioside, neotame, brazzein, caramel, coconut sugar, maltodextrin, sorghum syrup, tagatose, aspartame, acesulfame-K, saccharine, sucralose, and cyclamates.

Embodiment 18

The method of any of embodiments 1 to 17, wherein the method further includes the addition of antioxidant.

Embodiment 19

The method of embodiment 18, wherein the antioxidant is selected from the group consisting of beta-carotene, lycopene, zeaxanthin, lutein, tocopherols, tocotrienols, rosemary extract, vitamin A, vitamin B3, vitamin C (ascorbic acid), resveratrol, green tea extract, coffeeberry extract, grape seed extract, blueberry extract, and goji berry extract.

Embodiment 20

The method of any of embodiments 1 to 19, wherein the method further includes the addition of grains or seeds.

Embodiment 21

The method of embodiment 20, wherein the grain is selected from the group consisting of amaranth, barley, buckwheat, millet, oat, rice, rye, sorghum, spelt, teff, triticale, wheat, and wild rice.

Embodiment 22

The method of embodiment 21, wherein the seed is selected from the group consisting of chia, flax, hemp, mustard, poppy, pumpkin, sunflower.

Embodiment 23

The method of any of embodiments 1 to 22, wherein the method further includes the addition of a dairy product.

Embodiment 24

The method of embodiment 23, wherein the dairy product is selected from the group consisting of milk, evaporated milk, condensed milk, buttermilk, cream, milk fat, ice cream, custard, ice milk, powdered milk, butter, cheese, kefir and yogurt.

Embodiment 25

The method of any of embodiments 1 to 24, the method further including the addition of an isolated protein.

Embodiment 26

The method of embodiment 25, wherein the isolated protein is selected from the group consisting of plant protein, pulse protein, nut protein, algal protein, dairy protein and mycoprotein.

Embodiment 27

The method of embodiment 26, wherein the isolated plant protein is selected from the group consisting of barley protein, oat protein, rice protein, wheat protein, and potato protein.

Embodiment 28

The method of embodiment 26, wherein the isolated pule protein is selected from the group consisting of common bean protein (*Phaseolus vulgaris*), chickepea protein, fava bean protein, lentil protein, lima bean protein, mung bean protein, peanut protein, and soy protein.

Embodiment 29

The method of embodiment 26, wherein the isolated nut protein is selected from the group consisting of almond protein, cashew protein, chestnut protein, hazelnut protein, macadamia nut protein, pecan protein, pistachio protein, and walnut protein.

Embodiment 30

The method of embodiment 26, wherein the isolated algal protein is selected from the group consisting *Spirulina* protein, *Chlorella* protein, blue-green algae protein, green algae protein, and red algae protein.

Embodiment 31

The method of embodiment 26, wherein the isolated dairy protein is selected from the group consisting of whey protein and casein.

Embodiment 32

The method of embodiment 26, wherein the isolated mycoprotein is selected from the group consisting of *Saccharomyces* protein and *Fusarium* protein.

Embodiment 33

The method of any of embodiments 1 to 32, wherein the fruit or vegetable preparation is an apple sauce.

DETAILED DESCRIPTION

Definitions

Figure 1:
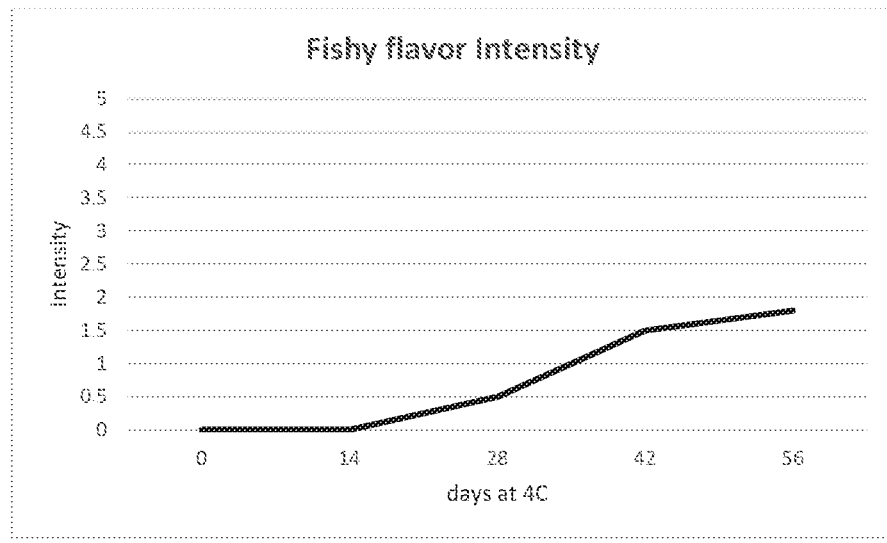
FIG. 1 shows the development of fishy flavor in a yogurt drink stored in a lighted dairy case. (See Example 1.)

Unless defined otherwise below, all technical and scientific terms used herein have the meaning commonly understood by a person skilled in the art to which this invention belongs.

"Acceptable appearance." "acceptable aroma," "acceptable odor," "acceptable taste," "acceptable flavor," or "acceptable texture" is an appearance, aroma, odor, taste, flavor, or texture that is acceptable to a sensory panel. The acceptable appearance, aroma, odor, taste, flavor, taste or texture can be compared to a reference product. A sensory panel can be a trained sensory panel or a non-trained sensory panel.

"Baked good" means a food item that is prepared by using an oven and usually contains a leavening agent. Baked goods include, but are not limited to brownies, cookies, pies, cakes and pastries.

"Bread" means a food item that contains flour, liquid, and usually a leavening agent. Breads are usually prepared by baking in an oven, although other methods of cooking are also acceptable. The leavening agent can be chemical or organic/biological in nature. Typically, the organic leavening agent is yeast. In the case where the leavening agent is chemical in nature (such as baking powder and/or baking soda), these food products are referred to as "quick breads". Crackers and other cracker-like products are examples of breads that do not contain a leavening agent.

"Choline" is an essential nutrient that is critical in many biological processes including brain development. Choline is 2-Hydroxy-N,N,N-trimethylethan-1-aminium. "Choline salt" is the salt form of choline. Choline salts include choline acetate, choline bicarbonate, choline chloride, choline citrate, choline bitartrate, choline lactate, and other choline salts. Choline also exists in the form of phoshotidylcholine. "Phosphotidylcholines" are a class of phospholipids that incorporate choline as a headgroup. Unless otherwise indicated, the term "choline" refers to any form of choline that can provide choline to a food product.

"Canned" product is a product that is packaged in a can that has a long shelf life. A "retorted" product is a product that is packaged in a pouch that has a long shelf life.

"Conventional food product" means a food composition or product intended for consumption, e.g., by a human, that is not nutritionally enhanced with a choline salt, omega-3 fatty acid, and optionally the conventional food product is not nutritionally enhanced with isolated protein.

"Cooked product" means a food that has been heated, e.g., in an oven, for a period of time.

"Dairy product" is any product that comprises a dairy ingredient. Dairy products include milk, yogurt, drinkable yogurt, cheese, cream, sour cream, cottage cheese and other products that contain ingredients derived from milk.

"Edible ingredient" means any substance or composition that is fit to be eaten. "Edible ingredients" include, without limitation, grains, fruits, vegetables, proteins, herbs, spices, carbohydrates, sugar, and fats as well as substances that are isolated therefrom.

"Drink" as used herein is a food that is drinkable and/or gulpable. For example, a drinkable yogurt product is a "drink."

The term "ingredient" as used herein means ingredients used in foods and/or food compositions or products, including fruit or vegetable preparations. "ingredient" includes, without limitation, preservatives, flavorants, food additives, food coloring, sugar substitutes and other ingredients found in various foods.

"Fat" means a lipid or mixture of lipids that is generally liquid or solid at ordinary room temperatures and pressures. "Fat" includes, without limitation, lard and butter.

"Fortified food composition," "nutritionally enhanced food compostions," "nutritionally enhanced food product" and "Finished food product" mean a food composition that is ready for packaging, use, or consumption. For example, a nutritionally enhanced food composition may have been cooked or the ingredients comprising the finished food product" may have been mixed or otherwise integrated with one another.

"Nutritionally enhanced food product," "Finished food product," and "fortified food product" mean a food that is ready for packaging, use, or consumption. For example, a nutritionally enhanced food product may have been cooked or the ingredients comprising the finished food product" may have been mixed or otherwise integrated with one another.

"Fresh product" is a product that is not frozen, canned or otherwise preserved to have a long shelf life.

"Food," "food composition." "food product" and "foodstuff" mean any composition intended to be or expected to be ingested by humans as a source of nutrition and/or calories. Food compositions or products can be composed primarily of carbohydrates, fats, water and/or proteins and make up substantially a person's entire daily caloric intake. A fruit preparation or vegetable preparation is a food, food composition, food product or foodstuff. A "food composition," "food product." "nutritionally enhanced food composition," or "nutritionally enhanced food product" is typically not encapsulated or in tablet form.

"Fortifying" or "nutritionally enhancing" means the addition of nutrients or other chemicals to increase the nutritional content of food food products. Fortifying and nutritionally enhancing is used interchangeably herein.

"Frozen" product is a product that is stored, transported, and/or sold in freezers at temperatures less than 0° C. and a solid at freezer temperatures. Frozen products are often consumed when the temperature of the product is less than 0° C.

"Fruit preparation" or "vegetable preparation" can refer to a puree of a fruit or vegetable, but can also include preparations that include small, cut pieces of fruit or vegetable. The addition of the small, cut fruit or vegetable pieces to a puree produces fruit or vegetable preparations that can be chewed when consumed. The mouth feel provided by chewing the small, cut fruit pieces or vegetable pieces is desirable in certain applications.

"Gelatin" is a food ingredient derived from collagen. Gelatin is prepared from collagen by exposure to acid, base, or heat. The exposure to acid, base, or heat denatures the collagen polypeptides and forms reversible gels.

"High temperature, short time" or "HTST" also known as flash pasteurization is a technique of pasteurizing foods to produce foods that are minimally exposed to heat and pasteurize the food. "HTST" treatment regime can be used to produce a product with acceptable biocontaminants. For example, the temperature of the treatment may be a temperature of from 65° C. to 100° C., from 65° C. to 95° C., from 65° C. to 90° C., from 65° C. to 85° C., from 65° C. to 80° C., from 65° C. to 75° C., from 65° C. to 70° C., from 70° C. to 100° C., from 70° C. to 95° C. from 0° C. to 90° C., from 70° C. to 85° C., from 70° C. to 85° C., from 70° C. to 80° C. or from 70° C. to 75° C., for a period of from 1 second to 180 seconds, from 1 second to 120 seconds, from 1 second to 90 seconds, from 1 second to 60 seconds, from 1 second to 30 seconds, from 5 seconds to 120 seconds, from 5 second to 90 seconds, from 5 seconds to 60 seconds, from 5 seconds to 30 seconds, from 10 seconds to 120 seconds, from 10 seconds to 90 seconds, from 10 seconds to 60 seconds, from 10 seconds to 30 seconds or from 10 seconds to 20 seconds.

"Ingredient comprising protein" is an ingredient that comprises protein. Ingredients that comprise protein include milk, milk products, yogurt, frozen yogurt butter, cream, ice cream, soft serve ice cream, sour cream, cheese, grain, flour, legumes, vegetables, fruit, products derived from vegetable or fruit, such as apple sauce, nuts, nut butters, meat products, and other ingredients that are used to prepare food products or consumed directly.

"Isolated protein" means a polypeptide that is separated from the original source of the polypeptide. Milk proteins are polypeptides isolated from milk. Casein and whey are examples of isolated mild proteins. Concentrated milk protein (MPC) is another milk protein. Similarly, soy proteins are polypeptides isolated from soy. A protein concentrate is an isolated protein.

"Lipid" means any of a class of molecules that are soluble in nonpolar solvents or polar organic solvents and relatively or completely insoluble in water. Lipid molecules have these properties, because they are largely composed of long hydrocarbon tails that are hydrophobic in nature. Examples of lipids include fatty acids (saturated and unsaturated); glycerides or glycerolipids (such as monoglycerides, diglycerides, triglycerides or neutral fats, and phosphoglycerides or glycerophospholipids); and nonglycerides (sphingolipids, tocopherols, tocotrienols, sterol lipids including cholesterol and steroid hormones, prenol lipids including terpenoids, fatty alcohols, waxes, and polyketides).

"Non-photo protective packaging material" is packaging material that does not provide protection against UV and visible light.

"Nutritional supplement" means a composition intended to supplement the diet by providing specific nutrients as opposed to bulk calories. A nutritional supplement may contain any one or more of the following ingredients: a vitamin, a mineral, an herb, an amino acid, an essential fatty acid, and other substances. Nutritional supplements are typically tableted or encapsulated. A single tableted or encapsulated nutritional supplement is typically ingested at a level no greater than 15 grams per day. A nutritionally enhanced food composition, food, food composition, food product or food stuff is not a nutritional supplement.

"Oil" means any triacylglyceride (or triglyceride oil), produced by organisms, including microalgae, other plants, and/or animals. "Oil," as distinguished from "fat", refers, unless otherwise indicated, to lipids that are generally liquid at ordinary room temperatures and pressures. However, coconut oil is typically solid at room temp, as are some palm oils and palm kernel oils. For example, "oil" includes vegetable or seed oils derived from plants, including without limitation, an oil derived from soy, rapeseed, canola, palm, palm kernel, coconut, corn, olive, sunflower, cotton seed, cuphea, peanut, camelina sativa, mustard seed, cashew nut, oats, lupine, kenaf, calendula, hemp, coffee, linseed, hazelnut, euphorbia, pumpkin seed, coriander, camelina, sesame, safflower, rice, tung oil tree, cocoa, copra, pium poppy, castor beans, pecan, jojoba, jatropha, macadamia. Brazil nuts, and avocado, as well as combinations thereof. Animal fats and oils includes butterfat, cream, ghee, lard, tallow and other edible fats and oils derived from animals.

"Omega-3 fatty acids" also called ω-3 fatty acids or n−3 fatty acids are polyunsaturated fatty acids (PUFA) that contain a carbon-carbon double bond at the ω-3 position of the carbon chain of the fatty acid. Three common types of fatty acids are alpha-linolenic acid (ALA), found in plant oils, and eicosapentaenoic acid (EPA) and docosahexaenoic acid (DHA) found in marine oils. Marine algae are sources of DHA and EPA and plant oils such as flax seed oil and walnut oil are common sources of ALA.

"Peroxide value" is a measure of the rancidity of unsaturated fats and oils. Peroxide value is defined as the amount of peroxide oxygen arising from degradation of unsaturated fats per kilogram oil. Peroxide values are typically expressed as milliequivalents.

"Polysaccharide" is a polymeric carbohydrate molecule. Polysaccharides can be modified or unmodified.

"Probiotic." or "active culture" are live microorganisms that provide health benefits when consumed. Yogurt, kombucha, miso, sauerkraut, kimchi are foods that are known to provide probiotics or active cultures when consumed.

"Protein" or "polypeptide" as used herein is a chain of amino acid monomers linked together "amide" bonds or "peptide" bonds. "Protein" and "polypeptide" comprise at least two amino acid monomers an may include hundreds or thousands of amino acid monomers.

"Puree" is a fruit or vegetable that has been pureed, mashed, squashed, chopped, blended, macerated, juiced or otherwise processed to a liquid or pourable form. The fruit or vegetable that has been pureed, mashed, squashed, chopped, blended, macerated, juiced or otherwise processed to a liquid or pourable form can be in concentrated form. For example, the term "puree" includes concentrated fruit juice or concentrated vegetable juice. The puree can also include small, cut pieces of the fruit or vegetable.

"Refrigerated" or "refrigerated storage" mean that a food composition or product (including a fruit or vegetable preparation) is stored in a temperature controlled environment that maintains a temperature that is below room temperature. Typically, refrigerated temperatures range from 1° C. to 10° C.

"Shelf stable" product is a product that can be safely stored at room temperature in a sealed container for an extended period of time.

"Suitable for human consumption" means a composition can be consumed by humans as dietary intake without ill health effects and can provide significant caloric intake due to uptake of digested material in the gastrointestinal tract.

"Uncooked product" means a composition that has not been subjected to heating but may include one or more components previously subjected to heating.

"W/W" or "w/w", in reference to proportions by mass, means the ratio of the mass (weight) of one substance in a composition to the total mass of the composition (e.g., fruit or vegetable composition). For example, a nutritionally enhanced food composition or product that comprises 5% w/w omega-3 fatty acid means that 5% of the nutritionally enhanced food composition's or product's mass is omega-3 fatty acid and the remainder of the weight of the composition s composed of other ingredients. For example, for a food composition or product that is 5% w/w omega-3 fatty acid, 100 grams of a nutritionally enhanced food composition or product has 5 grams of the omega-3 fatty acid. Similarly, a food composition or product that is 2.5% w/w choline (or choline salt), 100 grams of a nutritionally enhanced food composition or product has 2.5 grams of choline (or choline salt).

Compositions Including Choline and Omega-3 Fatty Acid to Nutritionally Enhance Food Products and Nutritionally Enhanced Food Products A composition including choline and omega-3 fatty acid for nutritionally enhancing a food product is provided. When nutritionally enhanced with the composition, the food product has an acceptable taste or acceptable odor, as determined by a sensory panel, or the food product has a peroxide value of less than 50 mEq.

The oxidation of polyunsaturated fatty acids, such as omega-3 fatty acids, in foods produce food products with unacceptable taste or unacceptable odor. It has been surprisingly and unexpectedly discovered that composition having high levels of choline or choline salt, and high levels of omega-3 fatty acids when added to food products produce food product with acceptable taste, acceptable odor or produces food products with peroxide values of less than 50 mEq.

In various embodiments, the peroxide value of the food product when nutritionally enhanced with the composition provided herein is less than 50 mEq, less than 40 mEq, less than 35 mEq, less than 30 mEq, less than 25 mEq, less than 20 mEq, less than 15 mEq, less than 10 mEq, or less than 5 mEq. Alternatively, the peroxide value of the food product is between 1-50 mEq, 1-45 mEq, 1-40 mEq, 1-35 mEq, 1-30 mEq, 1-25 mEq, 1-24 mEq, 1-23 mEq, 1-22 mEq, 1-21 mEq, 1-20 mEq, 1-17.5 mEq, 1-15 mEq, 1-12.5 mEq, and 1-10 mEq. Peroxide values are measured in commercially available machines and can be performed according to AOCS Official Method Cd 8-53, ISO/IEC 17025, or other known methods.

In one embodiment, the composition is added to the food product in a sufficient amount to produce a food product that comprises at least 0.25 mg choline salt per gram of food product (mg/g) and at least 0.25 mg omega-3 fatty acid per gram of food product (mg/g). Unless otherwise indicated, the unit "mg/g" refers to milligrams of constituent (e.g., choline salt or omega-3 fatty acid) per gram of food product. Accordingly, the phrase "at least 0.25 mg/g choline salt" means at least 0.25 mg choline salt per gram of food product, and the phrase "at least 0.25 mg/g omega-3 fatty acid" means at least 0.25 mg omega-3 fatty acid per gram of food product.

In certain embodiments, the food product comprises at least 25 mg protein per gram of food product before or after addition of the composition to the food product. In some embodiments, isolated protein, which can be included in the composition, is added to the food product to achieve a protein level of at least 25 mg protein per gram of food product (also expressed as "25 mg/g protein").

In some embodiments, the level of oxidation of the omega-3 fatty acids present in the food product is decreased as compared to a food that is not nutritionally enhanced with the composition.

Cholin

Any suitable source of choline can be used in the compositions, food products, and methods described herein. In some embodiments, the nutritionally enhanced food product when nutritionally enhanced with the composition provides a food product that includes at least 0.25 mg choline or choline salt per gram of food product. In various embodiments, the food product is nutritionally enhanced with the composition provided herein to provide choline or choline salt at a concentration of between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g. The amount of choline salt in the composition is thus sufficient to provide the desired concentration of choline salt to the food product. As those of skill in art readily appreciate, this amount will vary depending on the relative amounts of the choline- or choline salt-containing composition and the food product that are combined.

The choline salt of the compositions taught herein can be selected from the group consisting of choline acetate, choline bicarbonate, choline chloride, choline citrate, choline bitartrate, and choline lactate.

In some embodiments, phosphotidylcholine and/or freebase choline is used, instead of or in addition to a choline salt, to supply choline to the nutritionally enhanced food. Suitable concentrations of different forms of choline can be determined based on the guidance provided herein. For example, as those of skill in the art know, choline chloride is 74% choline by weight, whereas phosphotidylcholine is only 13% by weight. In general, the amount of, e.g., phosphotidylcholine used should supply choline in the amounts given above.

Omega-3 Fatty Acid

The nutritionally enhanced food product when nutritionally enhanced with the composition provides a food product that comprises at least 0.25 mg omega-3 fatty acid per gram of food product. Various embodiments provide food products nutritionally enhanced with the composition to prepare food product comprising omega-3 fatty acid at a concentration of between 0.25 mg/g and 5 mg/g, between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g food product. In some embodiments (e.g., some fruit or vegetable preparations described herein), higher concentrations of omega-3 fatty acid are employed. In various embodiments, the omega-3 fatty acid concentration per gram of food product is between 0.5 mg/g and 10 mg/g, between 1.0 mg/g and 8 mg/g, between 1.5 mg/g and 6 mg/g, between 2 mg/g and 4 mg/g, or between 2 mg/g and 3 mg/g. The amount of omega-3 fatty acid in the composition is thus sufficient to provide the desired concentration of omega-3 fatty acid to the food product. As those of skill in art readily appreciate, this amount will vary depending on the relative amounts of the omega-3 fatty acid-containing composition and the food product that are combined.

Any suitable source of omega-3 fatty acids can be used in the compositions, food products, and methods described herein. Omega-3 fatty acids can be obtained from a vegetarian or non-vegetarian source. The omega-3 fatty acid of the composition that is added to prepare the food product can be selected from the group consisting of docosahexaenoic acid (DHA), eicosapentaenoic acid (EPA) and alpha-linolenic acid (ALA). If a combination of different omega-3 fatty acids is used, the total amount of DHA, EPA and/or EPA is at least 0.25 mg/g food product, and the concentration ranges recited above refer to the amount of omega-3 fatty acid, regardless of type(s). The composition can include DHA alone (i.e., as the only omega-3 fatty acid), EPA alone, or ALA alone. Alternatively, any combination of DHA, EPA and ALA can be used to nutritionally enhance the food product. For example, the composition can include DHA and ALA. The composition can include EPA and ALA. The composition can include DHA and EPA. The composition can include DHA, EPA and ALA.

The omega-3 fatty acids used in compositions and products described herein (e.g., the fruit or vegetable preparations discussed below) can be encapsulated or non-encapsulated. Encapsulated fatty acids are sometimes referred to as "microencapsulated." Omega-3 fatty acids can be encapsulated by proteins, such as dairy proteins or plant proteins (see below for description of these), or modified or unmodified carbohydrates. "Modifications" to carbohydrates (e.g., polyaccharides) can include any modification known to those of skill in art that would be appropriate in this context. Examples include heat-modification, enzymatic modification, grinding, and co-mixing, which are the most common types of polysaccharide modification. In illustrative embodiments, omega-3 fatty acids can be encapsulated with modified polysaccharide, unmodified polysaccharide, or gelatin. Polysaccharides useful in encapculating omega-3 fatty acids include agar, carageenen, maltodextrin, corn syrup solids, pectin, xanthan gum, gellan gum, monosaccharides and disaccharides. Omega-3 fatty acids can also be encapsulated with monosaccharides or disaccharides. Other methods of micro-encapsulating omega-3 fatty acids include the formation of liposomes. Encapsulation methods for omega-3 fatty acids are reviewed in Feixollahi et al. (January 2018) Current Nutrition & Food Science 14(2):90-103, which is hereby incorporated by reference in its entirety for this description.

Protein

In various embodiments, the food product when nutritionally enhanced with the composition comprises protein at a concentration of 25-200 mg/g, 25-180 mg/g, 25-170 mg/g, 25-150 mg/g, 25-125 mg/g, 25-120 mg/g, 25-110 mg/g, 25-100 mg/g, 25-90 mg/g, 25-80 mg/g, 25-70 mg/g, 25-60 mg/g, or 25-50 mg/g. The protein can be already present in the food product prior to addition of the composition, present in the composition itself, or some combination thereof.

In various embodiments, the food product includes protein at a concentration of 25-200 mg/g, 25-180 mg/g, 25-170 mg/g, 25-150 mg/g, 25-125 mg/g, 25-120 mg/g, 25-110 mg/g, 25-100 mg/g, 25-90 mg/g, 25-80 mg/g, 25-70 mg/g, 25-60 mg/g, or 25-50 mg/g.

In certain embodiments, the food product is nutritionally enhanced with an isolated protein, which can be included in the composition or added to the food product separately from the composition. Accordingly, the composition can include sufficient protein to deliver at least 1, 2, 3, 4, 5, 6, 7, 8, 9, 10, 11, 12, 13, 14, 15, 16, 17, 18, 19, 20, 21, 22, 23, 24, 25 mg/g to the food product or a level of protein falling within any of the protein ranges indicated above.

The isolated protein can be any isolated protein. Isolated proteins that can be added to the food product include dairy proteins. Preferred dairy proteins are milk protein, casein, or whey. Proteins isolated from plant sources can also be used, including soy protein, pea protein, cottonseed protein, corn protein, or wheat protein. Additional protein sources that can be employed are discussed below in the subsection under "Further Ingredients" entitled "Protein."

Illustrative Concentrations of Choline, Omega-3 Fatty Acids, and Optionally Isolated Protein In illustrative embodiments, a composition for nutritionally enhancing a food product (e.g., stirred yogurt) can include ALA at a concentration sufficient to yield a food product having ALA at a concentration of 0.45 mg/g food product to about 4.5 mg/g food product and DHA at a concentration sufficient to yield a food product having about 0.40 mg/g food product to about 3.5 mg/g food product, along with choline (e.g., choline chloride) at a concentration sufficient to yield a food product having about 0.70 mg/g food product to about 2.5 mg/g food product. In a specific, illustrative embodiment, a composition for nutritionally enhancing a food product (e.g., stirred or drinkable yogurt) can include ALA at a concentration sufficient to yield a food product having ALA at a concentration of about 1.4 mg/g food product and DHA at a concentration sufficient to yield a food product having about 1.15 mg/g food product, along with choline (e.g., choline chloride) at a concentration sufficient to yield a food product having about 1.06 mg/g food product. If the food product is to include isolated protein, the isolated protein can, but need not, be included in the composition for nutritionally enhancing the food product. If isolated protein is included in the composition, in illustrative embodiments, the isolated protein (e.g., milk protein concentrate at 85% protein by dry matter) can be included at a concentration sufficient to yield a food product having about 15 mg/g food product to about 55 mg/g of food product.

In illustrative embodiments, the nutritionally enhanced food products (e.g., stirred yogurt) include ALA at a concentration of 0.45 mg/g food product to about 4.5 mg/g and DHA at a concentration of about 0.40 mg/g food product to about 3.5 mg/g food product in combination with choline (e.g., choline chloride) at a concentration of about 0.70 mg/g food product to about 2.5 mg/g food product. In a specific, illustrative embodiment, a nutritionally enhanced food product (e.g., stirred or drinkable yogurt) can include ALA at a concentration of about 1.4 mg/g food product and DHA at a concentration of about 1.15 mg/g food product, along with choline (e.g., choline chloride) at a concentration of about 1.06 mg/g food product. In illustrative embodiments in which isolated protein is added to the food products, the concentration of isolated protein (e.g., milk protein concentrate at 85% protein by dry matter) can be from about 15 mg/g food product to about 55 mg/g of food product. Generally, a lower amount of protein can be used if the food product includes a basic ingredient that has some protein. For example, milk typically has on the order of 35 mg protein/g, and therefore, milk-based food products may (depending on the volumes of other components added to the milk) may not need to have isolated protein added to it to produce a nutritionally enhanced food product containing at least 25 mg protein/g food product. (See, e.g., Example 1, disclosing these concentration ranges for ALA, DHA, choline, and protein)

Methods for Preparing Compositions for Nutritionally Enhancine Food Products

A method of preparing a composition for nutritionally enhancing a food product entails combining choline or a choline salt, omega-3-fatty acid and an ingredient comprising protein or an isolated protein. In one embodiment, when a food product is nutritionally enhanced with said composition, the food product has an acceptable taste or acceptable odor as determined by a sensory panel, or the food product has a peroxide value of less than 50 mEq. In various embodiments, the peroxide value of the food product nutritionally enhanced with the composition is less than 50 mEq, less than 40 mEq, less than 35 mEq, less than 30 mEq, less than 25 mEq, less than 20 mEq, less than 15 mEq, less than 10 mEq, or less than 5 mEq.

In an embodiment of the method for preparing the composition, the choline or choline salt is first combined with the omega-3 fatty acid to prepare a choline salt/omega-3 fatty acid formulation, and the choline salt/omega-3 fatty acid formulation is combined with the ingredient comprising protein or an isolated protein.

In another embodiment, choline or choline salt, the omega-3 fatty acid and the ingredient comprising protein or an isolated protein, are combined simultaneously.

Methods for Preparing Nutritionally Enhanced Food Products

Nutritionally enhanced food products (or food compositions), such as those described above, can be prepared by combining choline and omega-3-fatty acid with at least one edible ingredient to produce a nutritionally enhanced food product (or food composition) that includes at least 0.25 mg/g choline (e.g., free-base choline, choline salt, or phosphotidylcholine), at least 0.25 mg/g omega-3 fatty acid, and optionally at least 25 mg/g protein. The resultant nutritionally enhanced food product (or food composition) has an acceptable taste or acceptable odor as determined by a sensory panel, or wherein the nutritionally enhanced food composition has a peroxide value of less than 50 mEq.

In one embodiments, the choline can be combined with the at least one edible food ingredient before the omega-3- fatty acid is combined with the at least one edible food ingredient. Alternatively, the omega-3-fatty acid can be combined with the at least one edible food ingredient before the choline is combined with the at least one edible food ingredient. In another embodiment, the choline and the omega-3 fatty acid can be combined simultaneously with the at least one edible food ingredient. This would be the case, for example, if the choline and omega-3 fatty acids had been "pre-combined" to form a composition for nutritionally enchancing food products (or food compostions), such as those described above. In isolated protein is added to the food product (or food compostions), it can be present in a composition for nutritionally enchancing food products or added separately. If the isolated protein is added separately, it can be added at any point for many applications, and for applications wherein the protein is best added at a particular point in preparing the nutritionally enhanced food product (or food compostions), this point will be apparent to, or readily determined by, those of skill in the art.

The choline, omega-3 fatty acids, proteins and concentrations thereof that are discussed above apply equally to the methods for preparing a nutritionally enhanced food product (e.g., food composition). The nutritionally enhanced food product (e.g., food composition) can be any food product. e.g., any of those described herein, and those of skill in the art can readily select one or more suitable edible ingredients for a given food product (e.g., food composition).

The method can additionally include any step(s) used in connection with the preparation of a particular food product (or food composition), such as mixing, blending, chopping, whipping, kneading, folding, heating, cooling, or freezing. Likewise, the method can additionally include packaging the food product (or food composition) in any suitable packaging. The packaging can be a photo-protective packaging material or a non-photo protective packaging material, optionally wherein the non-photo protective packaging material comprises polyethylene terephthalate (PET), polystyrene, polypropylene, polylactic acid (PLA), or other plant-based equivalents thereof.

Nutritionally Enhanced Food Products and Their Stability

As noted above, in various embodiments, the food product when nutritionally enhanced with the composition includes choline or choline salt at a concentration of between 0.25 mg/g and 5 mg/g food product, DHA at a concentration of between 0.25 mg/g and 5 mg/g food product, and/or ALA at a concentration of between 0.25 mg/g and 5 mg/g food product. In some embodiments, the food product includes protein at a concentration of between 25 mg/g and 200 mg/g of food product, in addition to some form of choline and at least one omega-3 fatty acid. (See above for additional concentration ranges of these components.)

The food product when nutritionally enhanced with a composition provided herein is stable when exposed to light at a temperature of between 0° C. and 25° C. for at least 2 weeks, the food product has an acceptable taste or acceptable odor, or the nutritionally enhanced food product has a peroxide value of less than 50 mEq. As noted above, omega-3 fatty acids are chemically unstable and easily oxidize when exposed to UV or visible light. In various embodiments, the food product when nutritionally enhanced with the composition has an acceptable taste or acceptable odor when the nutritionally enhanced food product is exposed to light for at least 4 weeks, at least 6 weeks, at least 8 weeks, at least 10 weeks, at least 12 weeks, at least 18 weeks, at least 24 weeks, or at least 52 weeks.

The food product when nutritionally enhanced with a composition provided herein has acceptable taste, acceptable odor or a peroxide value of less than 50 mEq when the food product is stored in a non-refrigerated container or a refrigerated container. The food product can be stored in a non-refrigerated container or a refrigerated container for at least 4 weeks, at least 6 weeks, at least 8 weeks, at least 10 weeks, at least 12 weeks, at least 18 weeks, at least 24 weeks, or at least 52 weeks and have acceptable taste, acceptable odor or a peroxide value of less than 50 mEq. The refrigerated or non-refrigerated container can be a lighted or unlighted retail display case.

In certain embodiments, the food product nutritionally enhanced with a composition described herein has no, or an acceptably low level of, fishy taste, metallic taste, or rancid taste. In some embodiments, the food product nutritionally enhanced with a composition described herein has a reduced fishy taste, reduced metallic taste or reduced rancid taste as compared to a food product that is not nutritionally enhanced with choline or choline salt and omega-3 fatty acid.

In another aspect, the food product nutritionally enhanced with a composition described herein the food product nutritionally enhanced with a composition described herein has no, or an acceptably low level of, vegetable odor, fruity odor, floral odor, medicinal odor, chemical odor, fishy odor, offensive odor, painty odor or earthy odor. In some embodiments, the food product nutritionally enhanced with a composition described herein has has a reduced vegetable odor, fruity odor, floral odor, medicinal odor, chemical odor, fishy odor, offensive odor, painty odor or earthy odor as compared to a food that is not nutritionally enhanced with the composition.

The food product nutritionally enhanced with the composition is any food product that can be consumed by a human or an animal. In one embodiment, the food product is a dairy product. The dairy product can be whole milk, reduced fat milk, ultra-filtered milk, flavored milk, a flavored milk beverage, a meal replacement beverage, a protein shake, a yogurt-based smoothie, yogurt, cheese, a cheese product, liquid creamer, powdered creamer, a probiotic shot, pudding, a dessert, dip, dressing, or sauce or condiment. In some embodiments, the food product is a non-dairy liquid or powdered creamer.

In one embodiment, the food product nutritionally enhanced with the composition is a beverage. The beverage can be milk, a cultured-yogurt drink, juice, a fruit drink, a carbonated drink, a milk substitute, including soy milk, almond milk and other "milk" derived from plant matter, an alcoholic beverage, a coffee drink, or a tea drink.

In some embodiments, the food product nutritionally enhanced with the composition is a nut butter or seed butter. Illustrative nut and seed butters include peanut butter, almond butter, cashew butter, chestnut butter, hazelnut butter, macadamia nut butter, pecan butter, walnut butter, brazil nut butter, pistachio butter, sesame seed butter (tahini), sunflower seed butter, pumpkin seed butter, and the like.

In certain embodiments, the food product nutritionally enhanced with the composition is a bar, such as a candy, granola, energy, protein, or meal replacement bar. Such bars can include complex carbohydrates, such as oats or barley, as well as sugars like fructose, glucose, maltodextrin, etc. Fats commonly included in such bars included cocoa butter and chocolate. Other ingredients can include, for example, any of the nut or seed butters noted above, and any suitable ingredient listed below in the section entitled "Further Ingredients," e.g., grain, seeds, protein and sweetners. Bars can be any shape and can be enrobed in a coating, such as yogurt or chocolate.

The food product nutritionally enhanced with the composition provided herein are fresh, frozen, or shelf-stable. In an embodiment, the food product is canned or retorted.

Nutritionally enhance food products can include additional ingredients, such as one or more of those described in the section below entitled "Further Ingredients."

Food products nutritionally enhanced with the composition that are frozen foods include ice cream, soft serve ice cream, ice cream novelties, frozen desert, frozen yogurt, popsicles, frozen entrees, frozen prepared foods, frozen dinners, frozen lunches, and frozen breakfasts.

Illustrative Formulations

Illustrative formulations for stirred yogurt, suitable for cups and tubes, are given in the Tables below.

| Ingredient | % by weight |
| --- | --- |
| Whole Milk, Fluid, 3.5% Milk Fat, non-GMO | 80-95 |
| Milk protein concentrate at 85% protein by dry matter | 2-6 |
| Skim milk powder-low temperature dry | 0.5-3% |
| Starch, Tapioca, | 1-4 |
| Flax Oil, 50% ALA | 0.1-0.8 |
| Pectin/Agar | 0.1-0.8 |
| DHA, 40% | 0.1-0.8 |
| Choline Chloride, 74% | 0.1-0.3 |
| Locust Bean Gum POR/A Powder | 0.1-0.3 |
| Starter Culture (*Steptococcus thermophilus, Lactobacillus delbrueckii* subsp. *bulgaricus, Lactobacillus delbrueckii* subsp. *lactis*, Lactose) | 0.01-0.4% |
| Mixed Tocopherol 95 | 0.001-0.005 |

| Ingredient | % of Formulation |
| --- | --- |
| Whole Milk | 70.24-89.9% |
| Stabilizer Blend | 1.2-3.03% |
| Non Fat Dry Milk | 1.4-4.8% |
| Flax Oil (50% ALA) | .11-.95% |
| Algal Oil (40% DHA) | .11-.95% |
| Choline Chloride (74% Choline) | .05-.495% |
| Culture | .001-.04% |
| Antioxidant | .001-.04% |
| Fruit Prep | 9.95-19.95% |

Illustrative formulations for yogurt drinks are given in the Tables below.

| Ingredient | % by weight |
| --- | --- |
| Whole Milk, Fluid, 3.5% Milk Fat | 60-75 |
| Starch, Tapioca, Native | 0.2-0.8 |
| MPC-85 | 1-4 |
| Gellan Gum | 0.02-0.12 |
| Water | 25-40 |
| DHA, 40% | 0.1-0.25 |
| Flax Oil, 50% ALA | 0.1-0.25 |
| Choline Chloride, 74% | 0.05-0.15 |
| Mixed Tocopherol 95 | 0.001-0.01 |
| Starter Culture (*Streptococcus thermophilus, Lactobacillus delbrueckii* subsp. *bulgaricus, Lactobacillus delbrueckii* subsp. *lactis*, Lactose) | 0.01-0.4% |
| Total | 100% |

| Ingredient | % of Formulation |
| --- | --- |
| Whole Milk | 40-60.5% |
| Tapioca Starch | .1-2.05% |
| Milk Protein Concentrate | 1.2-3% |
| Gellan Gum | .01-1.05% |
| Water | 15.5-30% |
| Algal Oil (40% DHA) | .11-.95% |
| Flax Oil (50% ALA) | .11-.95% |
| Choline Chloride (74% Choline) | .05-.495% |
| Antioxidant | .001-.04% |
| Culture | .001-.04% |
| Fruit Prep | 9.95-19.95% |

An illustrative formulation for a chocolate milk/milk drink is given in the Table below.

| Flavored milk Ingredients | % by Weight % |
| --- | --- |
| Milk 1.2% BF, 10.2% total solids | 85-95 |
| Cocoa powder-defatted or full fat, alkalized or not | 1-6 |
| Sugar-fructose, sucrose, or other | 3-10 |
| Stabilizer-carrageenan, locust bean gum | 0.1-2.0 |
| Omega-3 fatty acid powder | .05-4* |
| Choline chloride | 0.01-0.2 |
| flax oil ALA | .05-2.0 |
| Mixed tocopherols (0.07%) | 0.05-0.1 |
| Rosemary extract | 0.01-0.1 |

*The omega-3 fatty acid powder, at 1.10% provided between about 0.9 to about 1.6 mg DHA per gram of food product (here, apple sauce) and about 0.2 to about 0.5 mg EPA per gram of food product.

An illustrative formulation for string cheese/sticks is given in the Table below.

| Ingredients | % by Weight |
| --- | --- |
| Milk 1-5% BF | 85-95 |
| Cheese culture | .001-.04% |
| Rennet | .001-.04% |
| MPC or WPC protein fortification | 0.2-1.5 |
| Omega-3 fatty acid powder | .05-4* |
| Choline chloride | 0.01-0.2 |
| flax oil ALA | .05-2.0 |
| Mixed tocopherols (0.07%) | 0.05-0.1 |
| Salt | 0.1-4.0 |

*The omega-3 fatty acid powder, at 1.10% provided between about 0.9 to about 1.6 mg DHA per gram of food product (here, apple sauce) and about 0.2 to about 0.5 mg EPA per gram of food product.

An illustrative formulation for a chocolate flavored pudding is given in the Table below.

| Ingredients | % by Weight |
| --- | --- |
| Milk 1-5% BF | 85-95 |
| Cocoa powder or natural flavors | 0.5-5 |
| Starch-Non-gmo tapioca or other | 0.5-2.5 |
| Stabilizer-carrageenan, Locust bean gum or other | 0.1-2.0 |
| Omega-3 fatty acid powder | .05-4 |
| Choline | 0.01-0.2 |
| flax oil ALA | .05-2.0 |
| Mixed tocopherols (0.07%) | 0.05-0.1 |
| Salt | 0.1-4.0 |

*The omega-3 fatty acid powder, at 1.10% provided between about 0.9 to about 1.6 mg DHA per gram of food product (here, apple sauce) and about 0.2 to about 0.5 mg EPA per gram of food product.

An illustrative formulation for a non-dairy creamer is given in the Table below.

| | |
|---|---|
| MTC Powder | 32-45% |
| Choline Bitartrate | 2.8-4.25% |
| Cane Sugar | 25-42% |
| Omega-3 fatty acid Powder | 12-18.85% |
| Vanilla | 7.75-12.25% |
| Disodium Phosphate Dihydrate | 2.65-2.95% |

*The omega-3 fatty acid powder, at 1.10% provided between about 0.9 to about 1.6 mg DHA per gram of food product (here, apple sauce) and about 0.2 to about 0.5 mg EPA per gram of food product.

Fruit or Vegetable Preparations Including Choline and Omega-3 Fatty Acid

In some embodiments, a fruit or vegetable preparation is nutritionally enhanced with choline and omega-3 fatty acid.

The oxidation of polyunsaturated fatty acids, such as omega-3 fatty acids, produce fruit or vegetable preparations supplemented with omega-3 fatty acids with unacceptable appearance, flavor, taste, aroma, odor or texture. It has been surprisingly and unexpectedly discovered that fruit or vegetable preparations having high levels of choline or choline salt, and high levels of omega-3 fatty acids with acceptable appearance, aroma, flavor or texture can be prepared. In addition, the fruit or vegetable preparations including high levels of choline or choline salt and high levels of omega-3 fatty acids are shelf stable and have acceptable appearance, aroma, flavor and/or texture after exposure to a temperature of between 10° C. to 50° C., 20° C. to 50° C. or 30° C. to 50° C. for a period of between 9 to 52 weeks.

In various embodiments, the fruit or vegetable preparations have peroxide values of less than 50 mEq. In one aspect, the peroxide value of the fruit or vegetable preparation is less than 50 mEq, less than 40 mEq, less than 35 mEq, less than 30 mEq, less than 25 mEq, less than 20 mEq, less than 15 mEq, less than 10 mEq, or less than 5 mEq. In another aspect, the peroxide value of the fruit or vegetable preparation is between 1-50 mEq, 1-45 mEq, 1-40 mEq, 1-35 mEq, 1-30 mEq, 1-25 mEq, 1-24 mEq, 1-23 mEq, 1-22 mEq, 1-21 mEq, 1-20 mEq, 1-17.5 mEq, 1-15 mEq, 1-12.5 mEq. and 1-10 mEq. Peroxide values are measured in commercially available machines and can be performed according to AOCS Official Method Cd 8-53. ISO/IEC 17025, or other known methods.

In certain embodiments, the fruit or vegetable preparation includes 100 mg to 1000 mg of omega-3 fatty acid per 100 grams of the fruit or vegetable preparation (mg/100 g) and includes 50 mg to 500 mg of choline per 100 grams of fruit or vegetable purees. Unless otherwise indicated, the unit "mg/g" refers to milligrams of constituent (e.g., choline or omega-3 fatty acid) per gram of fruit or vegetable preparation. Accordingly, the phrase "at least 0.25 mg/g choline salt" means at least 0.25 mg choline salt per gram of food product, and the phrase "at least 100 mg/100 g omega-3 fatty acid" means at least 100 mg omega-3 fatty acid per 100 g of fruit or vegetable preparation.

In various embodiments, the total amount of DHA, EPA and/or EPA is 100 mg/100 g to 1000 mg/100 g omega-3 fatty acid, between 100 mg/100 g to 750 mg/100 g omega-3 fatty acid, between 100 mg/100 g to 500 mg/100 g omega-3 fatty acid, between 100 mg/100 g to 400 mg/100 g omega-3 fatty acid, between 150 mg/100 g to 400 mg/100 g, between 150 mg/100 g to 350 mg/100 g, between 200 mg/100 g to 350 mg/100 g, or between 200 mg/100 g to 300 mg/100 g omega-3 fatty acid.

In various embodiments, the fruit or vegetable preparation provides choline or choline salt at a concentration of between 50 mg/100 g to 500 mg/100 g choline, between 50 mg/100 g to 400 mg/100 g choline, between 50 mg/100 g to 350 mg/100 g choline, between 50 mg/100 g to 300 mg/100 g choline, between 50 mg/100 g to 250 mg/100 g choline, between 50 mg/100 g to 200 mg/100 g choline, between 75 mg/100 g to 250 mg/100 g choline, between 75 mg/100 g to 200 mg/100 g choline, or between 100 mg/100 g to 200 mg/100 g choline.

Any of the above described cholines and omega-3 fatty acids (including encapsulated omega-3 fatty acids) and combinations thereof can be used in the fruit or vegetable preparations described herein.

The fruit or vegetable preparations can include additional ingredients, such as one or more of those described in the section below entitled "Further Ingredients."

Illustrative fruit or vegetable preparations include apple sauce, pear sauce, banana sauce, strawberry sauce, or combinations of two or more fruits and vegetables, such as, e.g., strawberry apple sauce and apple banana sauce.

In illustrative embodiments, the fruit or vegetable preparations (e.g., apple sauce, cinnamon apple sauce, or strawberry apple sauce) can include omega-3 fatty acids (e.g., from omega-3 fatty acid powder) at a concentration of about 5 mg/g fruit or vegetable preparation to about 15 mg/g fruit or vegetable preparation (e.g., 10 mg/g fruit or vegetable preparation) in combination with choline (e.g., choline chloride) at a concentration of about 0.70 mg/g fruit or vegetable preparation to about 3.5 mg/g fruit or vegetable preparation (e.g., 1.8 mg/g fruit or vegetable preparation). (See, e.g., Example 13.) In illustrative embodiments in which isolated protein is added to the fruit or vegetable preparation, the concentration of isolated protein (e.g., milk protein concentrate at 85% protein by dry matter) can be from about 15 mg/g food fruit or vegetable preparation to about 55 mg/g of fruit or vegetable preparation. (The illustrative apple sauce, cinnamon apple sauce, and strawberry apple sauce shown in Example 13 do not include any added isolated protein.

In illustrative embodiments, a composition for nutritionally enhancing a fruit or vegetable preparation (e.g., apple sauce, cinnamon apple sauce, or strawberry apple sauce) can include omega-3 fatty acid at a concentration sufficient to yield a fruit or vegetable preparation having omega-3 fatty acids (e.g., from omega-3 fatty acid powder) at a concentration of about 5 mg/g fruit or vegetable preparation to about 15 mg/g fruit or vegetable preparation (e.g., 10 mg/g fruit or vegetable preparation) along with choline (e.g., choline chloride) at a concentration sufficient to yield a a fruit or vegetable preparation having about 0.70 mg/g food product to about 3.5 mg/g food product. If the fruit or vegetable preparation is to include isolated protein, the isolated protein can, but need not, be included in the composition for nutritionally enhancing the fruit or vegetable preparation. If isolated protein is included in the composition, in illustrative embodiments, the isolated protein (e.g., milk protein concentrate at 85% protein by dry matter) can be included at a concentration sufficient to yield a food product having about 15 mg/g fruit or vegetable preparation to about 55 mg/g of fruit or vegetable preparation.

Illustrative Formulations

Illustrative formulations for applesauce are given in the Tables below.

| Applesauce Ingredients | % by Weight % |
|---|---|
| Apple puree | 80-90 |
| Apple juice concentrate | 5-10 |

-continued

| Applesauce Ingredients | % by Weight % |
|---|---|
| Apple puree concentrate | 2-8 |
| Omega-3 fatty acid powder | .05-4* |
| Choline chloride | 0.01-0.2 |
| flax powder ALA | .05-2.0 |
| Encapsulated ALA | |
| Mixed tocopherols (0.07%) | 0.05-0.1 |
| Rosemary extract | 0.01-0.1 |
| Ascorbic acid | 0.01-0.1 |

| Ingredients | % of Formulation by weight |
|---|---|
| Apple Base (e.g., 87.5-95% Apple puree and 5.5-10% Apple puree concentrate) | 87.5-99 |
| Omega-3 fatty acid powder | 0.5-1.95* |
| Choline Chloride (74% Choline) | 0.11-0.25 |
| Mixed tocopherols (0.07%) (Antioxidant) | 0.01-0.05 |
| Rosemary extract | 0.01-0.05 |

*The omega-3 fatty acid powder, at 1.10% provided between about 0.9 to about 1.6 mg DHA per gram of food product (here, apple sauce) and about 0.2 to about 0.5 mg EPA per gram of food product.

In some embodiments, the formulation given in the Table above can include 0.01-0.05% ascorbic acid.

Methods for Preparing Fruit or Vegetable Preparations

This disclosure also provides a method for preparing a fruit or vegetable preparation. The method of preparing the fruit or vegetable preparation includes:

a. providing a base fruit or vegetable puree;
b. combining choline and omega-3-fatty acid with the fruit or vegetable puree to prepare puree A;
c. subjecting puree A to a temperature that pasteurizes puree A; and
d. cooling the fruit or vegetable preparation to ambient temperature, wherein the fruit of vegetable preparation has an acceptable appearance, aroma, flavor and texture as determined by a sensory panel, or wherein the fruit or vegetable puree has a peroxide value of less than 50 mEq.

In some embodiments, the pasteurization is performed at a temperature of from 65° C. to 100° C. from 65° C. to 95° C., from 65° C. to 90° C., from 65° C. to 85° C., from 65° C. to 80° C., from 65° C. to 75° C., from 65° C. to 70° C. from 70° C. to 100° C., from 70° C. to 95° C., from 70° C. to 90° C., from 70° C. to 85° C. from 70° C. to 85° C. from 70° C. to 80° C., from 70° C. to 75° C., from 75° C. to 100° C., from 80° C. to 95° C., or from 85° C. to 90° C. for a period of from 1 second to 180 seconds, from 1 second to 120 seconds, from 1 second to 90 seconds, from 1 second to 60 seconds, from 1 second to 30 seconds, from 5 seconds to 120 seconds, from 5 second to 90 seconds, from 5 seconds to 60 seconds, from 5 seconds to 30 seconds, from 10 seconds to 120 seconds, from 10 seconds to 90 seconds, from 10 seconds to 60 seconds, from 10 seconds to 30 seconds or from 10 seconds to 20 seconds. In some embodiments, pasteurization is performed for longer time periods, such as 3, 5, 5, 6, 7, 8, 9, 10, 11, 12, 13, 14, 15, 16, 17, 18, 19, 20, 21, 22, 23, 24, 25, 26, 27, 28, 29, or 30 minutes. In illustrative embodiments, pasterization is performed at a temperature of from 65° C. to 100° C. for a period of from 1 second to 30 minutes; a temperature of from 80° C. to 96° C. for a period of from 3 to 25 minutes; a temperature of from 82° C. to 94° C. for a period of from 3 to 20 minutes; a temperature of from 84° C. to 92° C. for a period of from 3 to 15 minutes; or a temperature of from 85° C. to 90° C. (e.g., 88° C.) for a period of from 3 to 10 minutes (e.g., about 5 minutes).

In various embodiments, methods for preparing a fruit or vegetable preparation can include adding one or more additional ingredients to the base fruit or vegetable puree, puree A, or the fruit or vegetable preparation itself.

The methods for preparing a fruit or vegetable preparation disclosed herein can be used to prepare apple sauce, pear sauce, banana sauce, strawberry sauce, or combinations of two or more fruits and vegetables. Exemplary sauces include apple sauce, strawberry apple sauce, apple banana sauce.

In illustrative embodiments, the fruit or vegetable preparations (e.g., apple sauce, cinnamon apple sauce, or strawberry apple sauce) can include omega-3 fatty acids (e.g., from omega-3 fatty acid powder) at a concentration of about 5 mg/g fruit or vegetable preparation to about 15 mg/g fruit or vegetable preparation (e.g., 10 mg/g fruit or vegetable preparation) in combination with choline (e.g., choline chloride) at a concentration of about 0.70 mg/g fruit or vegetable preparation to about 3.5 mg/g fruit or vegetable preparation (e.g., 1.8 mg/g fruit or vegetable preparation). (See, e.g., Example 13.) Such preparations can be pasteurized at a temperature of between 85° C. to 90° C. (e.g., about 88° C. [190° F.]).

Stability of Fruit or Vegetable Preparations

The methods of preparing the fruit or vegetable preparation produce fruit or vegetable preparations that have acceptable appearance, aroma, flavor and texture after exposure to a temperature of between 10° C. to 50° C. for a period of between 9 to 52 weeks, between 10° C. to 50° C. for a period of between 9 to 48 weeks, between 10° C. to 50° C. for a period of between 9 to 26 weeks, between 10° C. to 50° C. for a period of between 9 to 18 weeks, between 10° C. to 50° C. for a period of between 9 to 12 weeks, or after exposure to a temperature of between 20° C. to 50° C. for a period of between 9 to 52 weeks, between 20° C. to 50° C. for a period of between 9 to 48 weeks, between 20° C. to 50° C. for a period of between 9 to 26 weeks, between 20° C. to 50° C. for a period of between 9 to 18 weeks, or between 20° C. to 50° C. for a period of between 9 to 12 weeks, or after exposure to a temperature of between 30° C. to 50° C. for a period of between 9 to 52 weeks, between 30° C. to 50° C. for a period of between 9 to 48 weeks, between 30° C. to 50° C. for a period of between 9 to 26 weeks, between 30° C. to 50° C. for a period of between 9 to 18 weeks, or between 30° C. to 50° C. for a period of between 9 to 12 weeks. These temperature ranges and times can be used for accelerated stability testing of the fruit or vegetable preparation acceptable appearance, aroma, flavor, and/or texture or for long-term storage of the fruit or vegetable preparation.

In some embodiments, a fruit or vegetable preparation that has acceptable appearance, aroma, flavor, and/or texture or a peroxide value of less than 50 mEq when the fruit or vegetable preparation is stored in a non-refrigerated container or a refrigerated container. The fruit or vegetable preparation can be stored in a non-refrigerated container or a refrigerated container for at least 4 weeks, at least 6 weeks, at least 8 weeks, at least 10 weeks, at least 12 weeks, at least 18 weeks, at least 24 weeks, or at least 52 weeks and have acceptable appearance, aroma, flavor and/or texture or a peroxide value of less than 50 mEq. The refrigerated or non-refrigerated container can be a lighted or unlighted retail display case.

In certain embodiments, the fruit or vegetable preparations disclosed herein are stable when exposed to light at a temperature of between 0° C. and 25° C. for at least 2 weeks. This is surprising because omega-3 fatty acids are chemically unstable and easily oxidize when exposed to UV or visible light. More specifically, the fruit or vegetable preparation has an acceptable taste or acceptable odor, or the fruit or vegetable preparation has a peroxide value of less than 50 mEq after this light exposure. In one aspect, the fruit or vegetable preparation has an acceptable appearance, flavor, taste, aroma, odor, and/or texture when the fruit or vegetable preparation is exposed to light for at least 4 weeks, at least 6 weeks, at least 8 weeks, at least 10 weeks, at least 12 weeks, at least 18 weeks, at least 24 weeks, or at least 52 weeks.

Further Ingredients

In various embodiments, the compositions, food products, and fruit and vegetable preparations described herein can include one or more of the following additional ingredients. Similarly, the methods described herein can include one or more steps of adding any of these ingredients or combinations thereof.

Iron

The compositions, food products, and fruit and vegetable preparations described herein can further include iron, and the methods disclosed herein can further include the step of adding iron. The iron should be in a form that is bioavailable and sufficiently stable for the particular application and should not adversely affect the taste of the composition, food product, or fruit and vegetable preparation to which it is added. In some embodiments, these aims are achieved by encapsulating (also termed "miroencapsulating") iron. Encapsulation methods are well known and include the use of materials discussed above in connection with the description of encapsulated omega-3 fatty acids.

Methods of encapsulating iron, specifically, are described in PCT Pub. No. WO2010040789, which is hereby incorporated by reference in its entirety for this description. This publication describes, in particular, encapsulated iron having a core including iron alginate and an outer layer of calcium alginate. The core can additionally include a bioavailable iron salt, such as ferric saccharate. The core can additionally include sodium alginate. The core can additionally include a chelating agent, such as saccharose. An encapsulated iron that is commercially available from AB-Fortis is AB-FORTIS® Microencapsulated Iron, which includes ferric sccharate (40% iron w/w) as the active agent, and calcium alginate including sodium alginate and calcium acetate.

In illustrative embodiments, an encapsulated iron, such as AB-Fortis is AB-FORTIS® Microencapsulated Iron, can be included in a food product or fruit and vegetable preparation at a concentration of about 0.25 mg/100 g of food product/fruit and vegetable preparation to about 20 mg/100 gm of food product/fruit and vegetable preparation. In various embodiments, the concentration of encapsulated iron can be from about between 0.25 mg/g and 18 mg/g, between 0.25 mg/g and 16 mg/g, between 0.25 mg/g and 14 mg/g, between 0.50 mg/g and 12 mg/g, between 0.50 mg/g and 10 mg/g, between 0.50 mg/g and 8 mg/g, between 0.50 mg/g and 6 mg/g, between 0.75 mg/g and 4 mg/g, between 0.75 mg/g and 3 mg/g, between 1 mg/g and 3 mg/g, and between 2 mg/g and 3 mg/g. In illustrative embodiments, the amount of encapsulated iron in a composition for nutritionally enhancing food products is sufficient to provide the desired concentration of iron to the food product. As those of skill in art readily appreciate, this amount will vary depending on the relative amounts of the iron-containing composition and the food product that are combined.

Encapsulated iron is particularly useful for nutritionally enhancing foods, such as dairy-based products like, milk, yogurt, ice cream, or cheese that cannot readily be enhanced with non-encapsulated iron.

Antioxidants

The compositions, food products, and fruit and vegetable preparations described herein can further include an antioxidant, and the methods disclosed herein can further include the step of adding an antioxidant. The antioxidant(s) can be selected from the group consisting of beta-carotene, lycopene, zeaxanthin, lutein, tocopherols, tocotrienols, rosemary extract, vitamin A, vitamin B3, vitamin C (ascorbic acid), resveratrol, green tea extract, coffeebery extract, grape seed extract, blueberry extract, and goji berry extract. In various embodiments, the amount of antioxidant(s) by mass (e.g., in a fruit or vegetable preparation) can be between 0.005% to 0.5%, between 0.005% to 0.4%, between 0.005% to 0.3%, between 0.005% to 0.2%, between 0.005% to 0.1%, between 0.01% to 0.1%, between 0.01% to 0.09%, between 0.01% to 0.08% between 0.01% to 0.07%, between 0.01% to 0.6%, or between 0.01% to 0.05%.

Grain and/or Seeds

The compostions, food products, and fruit and vegetable preparations described herein can further include grain and/or seeds, and the methods disclosed herein can further include the step of adding a grain and/or seeds. Any grain or seed and be employed for this purpose. Grains can be selected from the group consisting of amaranth, barley, buckwheat, millet, oat, rice, rye, sorghum, spelt, teff, triticale, wheat, quinoa, and wild rice. Seeds can be selected from the group consisting of chia, flax, hemp, mustard, poppy, pumpkin and sunflower. In various embodiments, the amount of grains or seed by mass (e.g., in a fruit or vegetable preparation) can be between 1% to 20%, between 1% to 15%, between 1% to 10%, between 2% to 10%, between 3% to 10%, between 4% to 10% or between 5% to 10%.

Protein

Embodiments in which protein is present with choline and omega-3 fatty acids are discussed above. Without being bound by any particular theory, it is thought that the presence of protein with choline and/or omega-3 fatty acids helps to stabilize one of both components. However, isolated protein can be added to any of the compostions, food products, and fruit and vegetable preparations described herein simply to increase the protein content of the compostions, food products, and fruit and vegetable preparations. Isolated proteins that can be added to the compostions, food products, and fruit and vegetable preparations described herein can, for example, be selected from plant protein, pulse protein, nut protein, algal protein, dairy protein, and mycoprotein. Illustrative isolated plant proteins include barley protein, oat protein, rice protein, wheat protein, and potato protein. Illustrative isolated pulse proteins include common bean protein (*Phaseolus vulgaris*), chickepea protein, fava bean protein, lentil protein, lima bean protein, mung bean protein, peanut protein, and soy protein. Illustrative isolated nut proteins include almond protein, cashew protein, chestnut protein, hazelnut protein, macademia nut protein, pecan protein, pistachio protein and walnut protein. Illustrative isolated algal proteins include *Spirulina* protein, *Chlorella* protein, blue-green algae protein, green algae protein and red algae protein. Illustrative isolated dairy proteins include whey protein and casein. Illustrative isolated mycoproteins include *Saccharomyces* protein and *Fusarium* protein. The amount of protein by mass (e.g., in a fruit or vegetable preparation) can between 0.05% to 5%, between 0.05% to 4%, between 0.05% to 3%, between 0.1% to 5%, between 0.1% to 4%, between 0.1% to 3%, between 0.2% to 5%, between 0.2% to 4%, between 0.2% to 3%, between 0.5% to 5%, between 0.5% to 4%, between 0.5% to 3%, between 0.75% to 5%, between 0.75% to 4%, between 0.75% to 3%, between 1% to 5%, between 1% to 4%, between 1% to 3% or between between 1% to 2%. In the case of protein bars and drings, the level of protein is typically higher. e.g., between 10 and 25 grams per serving.

Probiotic and/or Active Cultures

In some embodiments, the compostions, food products, and fruit and vegetable preparations described herein can further include include a probiotic or active cultures. The probiotic or active culture(s) can be selected from the group consisting of *Lactobacillus. Bifidobacterium, Saccharomyces, Enterococcus, Streptococcus, Pediococcus, Leuconostoc, Bacillus*, or any combination thereof. Probiotic or active cultures are useful in products like yogurt or yogurt-based drinks.

Sweeteners

In some embodiments, a sweetener can be included in the compostions, food products, and fruit and vegetable preparations described herein. Illustrative sweeteners include sucrose, glucose, fructose, corn syrup, monk fruit extract, sucromalt, allulose, agave, honey, maple syrup, erythritol, maltitol, sorbitol, mannitol, xylitol, xylose, *stevia*/rebaudioside; neotame, brazzein, caramel, coconut sugar, maltodextrin; sorghum syrup, tagatose, aspartame, acesulfame-K, saccharine, sucralose, and cyclamates.

Packaging

The compositions, food products, and fruit and vegetable preparations described herein can be packaged in a non-photo protective packaging material. The non-photo protective packaging material can include polyethylene terephthalate (PET), polystyrene, polylactic acid (PLA), or other plant-based equivalents thereof.

EXAMPLES

| Ingredient | % by weight |
|---|---|
| Whole Milk, Fluid, 3.5% Milk Fat, non-GMO | 80-95 |
| Milk protein concentrate at 85% protein by dry matter | 2-6 |
| Skim milk powder-low temperature dry | 0.5-3% |
| Starch, Tapioca, | 1-4 |
| Flax Oil, 50% ALA | 0.1-0.8 |
| Pectin/Agar | 0.1-0.8 |
| DHA, 40% | 0.1-0.8 |
| Choline Chloride, 74% | 0.1-0.3 |
| Locust Bean Gum POR/A Powder | 0.1-0.3 |
| Starter Culture (*Streptococcus thermophilus, Lactobacillus delbrueckii* subsp. *bulgaricus, Lactobacillus delbrueckii* subsp. *lactis*, Lactose) | 0.01-0.4% |
| Mixed Tocopherol 95 | 0.001-0.005 |

Process
1) Batch gmo or non-gmo milk to 3.5% milk fat and 12.5% total solids
2) Heat milk to 80-100 F
3) Batch 1—Blend in warm milk the Milk Protein Concentrate in high shear liquefier for 10 minutes
4) Batch 2—blend in warm milk the skim milk powder in high shear liquefier for 10 minutes
5) Batch 3—blend in warm milk the tapioca starch, locust bean gum, pectin/agar blend
6) Sent to batch tank. Test for total solids and fat to confirm composition against standard
7) Pump to HTST (High temperature/short time), and add DHA, Mixed Tocopherol, and Flax oil (ALA) to the balance tank prior to pasteurization.
8) Pasteurize between 170 F-190 F
9) Homogenize through standard homogenizer (Gaulen) in two stages. First stage 1000-1500 psi, and second stage 0-500 psi
10) Pump to culture tank, and take composition against standards
11) Add culture to tank at 103-110 F, and blend for 20 mins
12) Shut off agitation and allow to culture until the white mass reaches a pH of 4.4-4.9
13) Cool to 50 F under agitation. Once 50 F is achieved, shut off agitation Addition of fruit preparation and flavoring system
Fruit Prep

| Fruit Prep | |
|---|---|
| Ingredient | % by weight |
| Water | 40-60 |
| Sugar, Cane, non-GMO | 35-46 |
| Natural flavor | 2-7 |
| Starch, Tapioca, Native | 1-5 |
| Flavor enhancer | 1-4 |
| Color | 0.5-2.0 |
| Locust Bean Gum POR/A Powder | 0.1-0.5 |
| Monk Fruit Extract | 0.1-1.0 |

14) Add fruit prep/flavor system to white mass yogurt and blend for 10 mins
15) Send to packaging

| Ingredient | % by weight |
|---|---|
| Whole Milk, Fluid, 3.5% Milk Fat | 60-75 |
| Starch, Tapioca, Native | 0.2-0.8 |
| MPC-85 | 1-4 |
| Gellan Gum | 0.02-0.12 |
| Water | 25-40 |
| DHA, 40% | 0.1-0.25 |
| Flax Oil, 50% ALA | 0.1-0.25 |
| Choline Chloride, 74% | 0.05-0.15 |
| Mixed Tocopherol 95 | 0.001-0.01 |
| Starter Culture (*Streptococcus thermophilus, Lactobacillus delbrueckii* subsp. *bulgaricus, Lactobacillus delbrueckii* subsp. *lactis*, Lactose) | 0.01-0.4% |
| Total | 100% |

Process
1) Batch non-gmo milk to 3.5% BF and 12.5% total solids
2) Heat milk to 80-100 F
3) Batch 1—Blend in warm milk the M ilk Protein Concentrate in high shear liquefier for 10 minutes
4) Batch 3—blend in warm milk the tapioca starch, and gelan gum
5) Add water
6) Send to batch tank. Test for total solids and fat to confirm composition against standard
7) Pump to HTST (High temperature/short time), and add DHA, Mixed Tocopherol, and Flax oil (ALA) to the balance tank prior to pasteurization.
8) Pasteurize between 170 F-190 F
9) Homogenize through standard homogenizer (Gaulen) in two stages. First stage 1000-1500 psi, and second stage 0-500 psi 10) Pump to culture tank, and take composition against standards
11) Add culture to tank at 103-110 F, and blend for 20 mins
12) Shut off agitation and allow to culture until the white mass reaches a pH of 4.4-4.9
13) Cool to 50 F under agitation. Once 50 is achieved, shut off agitation
14) Fruit was prepared according the Example 1
15) Add fruit prep/flavor system to white mass yogurt and blend for 10 mins Example 3—Apple Sauce

| Applesauce Ingredients | % by Weight % |
|---|---|
| Apple puree | 80-90- |
| Apple juice concentrate | 5-10 |
| Apple puree concentrate | 2-8 |
| Omega-3 fatty acid powder | .05-4* |
| Choline chloride | 0.01-0.2 |
| flax powder ALA Encapsulated ALA | .05-2.0 |
| Mixed tocopherols (0.07%) | 0.05-0.1 |
| Rosemary extract | 0.01-0.1 |
| Ascorbic acid | 0.01-0.1 |

*The omega-3 fatty acid powder, at 1.10% provided between about 0.9 to about 1.6 mg DHA per gram of food product (here, apple sauce) and about 0.2 to about 0.5 mg EPA per gram of food product.

Process
1) Mix apple puree, concentrates and juices in vat
2) Blend for 10 mins
3) Add choline Chloride, DHA, ALA flax
4) Blend for 10 mins
5) Vat pasteurize, or tube in tube pasteurize at 170-190 F for 10 mins
6) Cool to 170
7) Hot fill Example 4—Chocolate Milk/Milk Drink

| Flavored milk Ingredients | % by Weight % |
|---|---|
| Milk 1.2% BF, 10.2% total solids | 85-95 |
| Cocoa powder-defatted or full fat, alkalized or not | 1-6 |
| Sugar-fructose, sucrose, or other | 3-10 |
| Stabilizer-carrageenan, locust bean gum | 0.3-2.0 |
| Omega-3 fatty acid powder | .05-4* |
| Choline chloride | 0.01-0.2 |
| flax oil ALA | .05-2.0 |
| Mixed tocopherols (0.07%) | 0.05-0.1 |
| Rosemary extract | 0.01-0.1 |

*The omega-3 fatty acid powder, at 1.10% provided between about 0.9 to about 1.6 mg DHA per gram of food product (here, apple sauce) and about 0.2 to about 0.5 mg EPA per gram of food product.

Process
1) Blend milk at 0.05-2.5%
2) Add milk to blender, and add cocoa powder, sugar, stabilizer
3) Pump to HTST
4) Add functional oils (DHA, ALA, choline, tocopherols) to the balance tank
5) Pasteurize at 171-190 and homengize 2 stage 1000-1500 first stage, 0-500 second stage, or UHT at 230 C for 15 seconds
6) Cool to 40-50 F off regen or cooling section of the HTST
7) Package Example 5—String Cheese/Sticks

| Ingredients | % by Weight |
|---|---|
| Milk 1-5%% BF | 85-95 |
| Cheese Culture | .001-.04% |
| Rennet | .001-.04% |
| MPC or WPC protein fortification | 0.4-1.5 |
| Omega-3 fatty acid powder | .05-4* |
| Choline chloride | 0.01-0.2 |
| flax oil ALA | .05-2.0 |
| Mixed tocopherols (0.07%) | 0.05-0.1 |
| Salt | 0.1-4.0 |

The omega-3 fatty acid powder, at 1.10% provided between about 0.9 to about 1.6 mg DHA per gram of food product (here, apple sauce) and about 0.2 to about 0.5 mg EPA per gram of food product.

Process
1) Add milk to liquefier/shear blender
2) Add DHA, ALA. Choline, Tocopherols, and rosemary extract to milk
3) Add WPC/MPC as required
4) Pasteurize at 171-190 and homogenize 2 stage 1000-1500 first stage, 0-500 second stage
5) Add milk blend to cheese vat at 80-110 F
6) Add culture and rennet
7) Culture to 4.6-4.8 pH
8) Cut curd with 0.5-1 inch cutting screens
9) Allow curd to set and cook to 100-150 F
10) Drain whey and wash curd. Add salt
11) Add to cooker stretcher machine and heat to 120-160 F
12) Extrude cheese in twin screw extruder
13) Pack sticks/string cheese and cool to 40 F Example 6—Flavored Pudding

| Ingredients | % by Weight |
|---|---|
| Milk 1-5%% BF | 85-95 |
| Cocoa powder or natural flavors | 0.5-5 |
| Starch-Non-gmo tapioca or other | 0.5-2.5 |
| Stabilizer-carrageenan, Locust bean gum or other | 0.1-2.0 |
| Omega-3 fatty acid powder | .05-4 |
| Choline | 0.01-0.2 |
| flax oil ALA | .05-2.0 |
| Mixed tocopherols (0.07%) | 0.05-0.1 |
| Salt | 0.1-4.0 |

Process
1) Add milk to liquefier or shear blender
2) Add cocoa powder, or natural flavor blends
3) Add starch
4) Add stabilizer
5) Add DHA, ALA, Choline
6) Vat pasteurize or tube in tube pasteurize at 170-190 f
7) Homogenize at 1000-1500 psi first stage, and 0-500 psi second stage or use colloid mill
8) Cool to 40-50 F or to 150-170 F
9) Package

Example 7—Peroxide Value Determination

The peroxide value is tested according to AOAC method 965.33

Example 8—Sensory Panel Testing

A sensory panel is convened to determine if the nutritionally enhanced food product has an acceptable taste or acceptable odor. Trained or untrained panelists are convened and are asked to evaluate the nutritionally enhanced food product for randity/oxidization of fats when the nutritionally enhanced food product is prepared. Next, the same panel or a different pane is asked to evaluate the nutritionally enhanced food product after the nutritionally enhanced food product was stored for a specified amount of time and temperature. The panelists are asked to rate the oxidation on a 9-point hedonic scale for rancidity (1—rancid; 9—not rancid), painty (1—painty; 9—not painty) and overall preference (1—dislike extremely; 9—like extremely). A nutritionally enhanced food product has acceptable taste or acceptable odor if the score is between 4-9.

Example 9—Sensory Panel Testing of Yogurt Drink

Yogurt was prepared according to Example 2 and evaluated by a sensory panel on day 0, 14, 28, 42 and 56 days. On day 0, single-serve bottles of strawberry yogurt drinks were assigned to dark control, lighted dairy case (700 Lx), or 2000 Lx LED light box at 4° C. per the timepoint structure below.

| Dark control | Lighted Dairy Case control (700 Lx) | 2000 lx light box |
|---|---|---|
| Times: Dark control will be evaluated each time dairy case or light box yogurts are evaluated | Time 0, 14 days, 28 days, 42 days*, 56 days | Time 0, 7 days, 14 days, 21 days* |

*Fishy flavor detected by all panelists at this timepoint

Descriptive Sensory Analysis

Overhead lights were off during all preparations of yogurts. Yogurts were dispensed into clear 2-oz lidded soufflé cups with 3-digit codes for descriptive sensory analysis and were served with spring water and unsalted crackers for palate cleansing. Descriptive analysis used a 0- to 15-point universal intensity scale with the SPECTRUM™ method and a previously established sensory language. Paper ballots were used. A descriptive sensory panel (n=7, 5 females, 2 males, ages 22-46 y) with more than 200 h experience with the descriptive analysis of dairy flavors and textures evaluated the yogurts. Consistent with SPECTRUM™ descriptive analysis training, panelists were presented with reference solutions of sweet, sour, salty, and bitter tastes to learn to consistently use the universal intensity scale (Meilgaard and others 1999; Drake and Civille 2003). Following consistent use of the Spectrum™ scale with basic tastes, panelists learned to identify and scale flavor descriptors using the same intensity scale through presentation and discussion of flavor definitions and references. Analysis of data collected from training sessions confirmed that panel results were consistent and that terms were no redundant, constistant with previous use of the developed language (Drake and others 2001; Drake and others 2005). Each panelist evaluated each yogurt in duplicate.

Statistical Analysis

Data were analyzed using analysis of variance (ANOVA) (XLSTAT, version 2014 Addinsoft Inc., New York, NY). All statistical analysis was carried out at a 95% significance level.

TABLE 1a

| Sensory profile of yogurt at time 0 | |
|---|---|
| Attribute | Dark control |
| Aroma intensity | 4.2 |
| In-mouth | |
| Cooked/milky | 3.6 |
| Sweet aromatic/vanillin | 1.6 |
| Fruity | 3.2 |
| Sour aromatic | 1.5 |
| Cardboard/mushroom | ND |
| Fishy | ND |
| Sweet taste | 8.4 |
| Sour taste | 1.5 |
| Metallic | 2.2 |

Attributes are scored on a 0 to 15 point universal Spectrum ™ intensity scale. Most flavor attributes fall between 0 and 5.
ND-not detected TABLE 1b

| Sensory profile of yogurt at day 7 | | |
|---|---|---|
| Attribute | Dark control | Light box |
| Aroma intensity | 3.8a | 3.3b |
| In-mouth | | |
| Cooked/milky | 3.6a | 3.2b |
| Sweet aromatic/vanillin | 1.5a | 0.7b |
| Fruity | 3.2a | 3.1a |
| Sour aromatic | 1.1a | 1.0a |
| Cardboard/mushroom | ND | 1.2 |
| Fishy | ND | ND |
| Sweet taste | 8.5a | 8.4a |
| Sour taste | 1.5a | 1.3a |
| Metallic | 2.0a | 2.2a |
| Comments | | Flavor is muted but free of off flavors |

Attributes are scored on a 0 to 15 point universal Spectrum ™ intensity scale. Most flavor attributes fall between 0 and 5.
ND-not detected
Means in a row followed by different letters are different ($p < 0.05$)

At 7 days, the yogurts in the light box are distinct in flavor profile from the dark control product. Flavor difference is due to light oxidized flavor. At 7 days, yogurts stored in the dark did not have fishy aroma and flavor.

TABLE 1c

| Sensory profile of yogurt at day 14 | | | |
|---|---|---|---|
| Attribute | Dark control | Light box | Dairy case |
| Aroma intensity | 3.9a | 3.3b | 3.3b |
| In-mouth | | | |
| Cooked/milky | 3.7a | 3.2b | 3.2b |
| Sweet aromatic/vanillin | 1.6a | 1.0b | 1.2b |
| Fruity | 3.0a | 2.8a | 2.8a |
| Sour aromatic | 1.1a | 1.0a | 1.0a |

TABLE 1c-continued

Sensory profile of yogurt at day 14

| Attribute | Dark control | Light box | Dairy case |
|---|---|---|---|
| Cardboard/mushroom | ND | 1.2a | 1.0a |
| Fishy | ND | 1.1 | ND |
| Sweet taste | 8.3a | 8.4a | 8.5a |
| Sour taste | 1.5a | 1.4a | 1.3a |
| Metallic | 2.0a | 2.1a | 2.2a |
| Comments | | Aroma is muted, low intensity of fishy flavor in-mouth (7/7 panelists) | Flavor is muted but free of off flavors |

Attributes are scored on a 0 to 15 point universal Spectrum ™ intensity scale. Most flavor attributes fall between 0 and 5.
ND-not detected
Means in a row followed by different letters are different ($p < 0.05$)

At 14 days, the yogurts in the light box have a distinct fishy flavor. Yogurts in the lighted dairy case are distinct in flavor profile from the dark control product. Flavor difference is due to light oxidized flavor. At 14 days, yogurts stored in the dark did not have fishy aroma and flavor.

TABLE 1d

Sensory profile of yogurt at day 21

| Attribute | Dark control | Light box | Dairy case |
|---|---|---|---|
| Aroma intensity In-mouth | 3.5a | 3.0b | 3.4a |
| Cooked/milky | 3.5a | 3.0b | 3.4a |
| Sweet aromatic/vanillin | 1.3a | 1.0a | 1.0a |
| Fruity | 3.0a | 2.4b | 2.8a |
| Sour aromatic | 1.0a | 1.0a | 1.0a |
| Cardboard/mushroom | ND | 1.0a | 1.0a |
| Fishy | ND | 1.6 | ND |
| Sweet taste | 8.3a | 8.4a | 8.5a |
| Sour taste | 1.5a | 1.5a | 1.3a |
| Metallic | 2.0a | 2.2a | 2.2a |
| Comments | | Visibly lighter in color, Aroma is muted, low intensity of fishy flavor in-mouth (7/7) | Slight visible color difference, Flavor is muted, 2/7 panelists consistently detected fishy flavor |

Attributes are scored on a 0 to 15 point universal Spectrum ™ intensity scale. Most flavor attributes fall between 0 and 5.
ND-not detected
Means in a row followed by different letters are different ($p < 0.05$)

At 21 days, the yogurts in the light box have a distinct fishy flavor. Yogurts in the lighted dairy case are distinct in flavor profile from the dark control product. Flavor difference is due to light oxidized flavor. A few panelists detected fishy flavor in the yogurt stored in the lighted dairy case. At 21 days, yogurts stored in the dark did not have fishy aroma and flavor.

TABLE 1e

Sensory profile of yogurt at day 28

| Attribute | Dark control | Dairy case |
|---|---|---|
| Aroma intensity | 3.5a | 3.1b |
| Cooked/milky | 3.5a | 3.1b |
| Sweet aromatic/vanillin | 1.3a | 1.0b |

TABLE 1e-continued

Sensory profile of yogurt at day 28

| Attribute | Dark control | Dairy case |
|---|---|---|
| Fruity | 3.0a | 2.6b |
| Sour aromatic | 1.0a | 1.0a |
| Cardboard/mushroom | ND | 1.3 |
| Fishy | ND | 0.5 |
| Sweet taste | 8.0a | 8.2a |
| Sour taste | 1.5a | 1.3a |
| Metallic | 2.0a | 2.2a |
| Comments | | Visibly lighter in color, Flavor is muted, 4/7 panelists consistently detected fishy flavor |

Attributes are scored on a 0 to 15 point universal Spectrum ™ intensity scale. Most flavor attributes fall between 0 and 5.
ND-not detected
Means in a row followed by different letters are different ($p < 0.05$)

At 28 days, yogurts in the lighted dairy case are distinct in flavor profile from the dark control product. Flavor difference is due to light oxidized flavor. More panelists detected fishy flavor in the yogurt stored in the lighted dairy case. At 28 days, yogurts stored in the dark did not have fishy aroma and flavor.

TABLE 1f

Sensory profile of yogurt at day 42

| Attribute | Dark control | Dairy case |
|---|---|---|
| Aroma intensity In-mouth | 3.5a | 2.8b |
| Cooked/milky | 3.5a | 2.8b |
| Sweet aromatic/vanillin | 1.5a | 0.8b |
| Fruity | 3.2a | 2.0b |
| Sour aromatic | 1.0a | 1.0a |
| Cardboard/mushroom | ND | 1.9 |
| Fishy | ND | 1.5 |
| Sweet taste | 8.2a | 8.5a |
| Sour taste | 1.5a | 1.3a |
| Metallic | 2.2a | 2.2a |
| Comments | | Fishy/metallic aroma, visibly lighter in color, Flavor is muted, 7/7 panelists consistently detected fishy flavor |

Attributes are scored on a 0 to 15 point universal Spectrum ™ intensity scale. Most flavor attributes fall between 0 and 5.
ND—not detected
Means in a row followed by different letters are different ($p < 0.05$)

At 42 days, yogurts in the lighted dairy case have a distinct fishy aroma and flavor. At 42 days, yogurts stored in the dark did not have fishy aroma and flavor.

TABLE 1g

Sensory profile of yogurt at day 56

| Attribute | Dark control | Dairy case |
|---|---|---|
| Aroma intensity In-mouth | 3.0a | 2.2b |
| Cooked/milky | 3.5a | 2.0b |
| Sweet aromatic/vanillin | 1.5 | ND |
| Fruity | 3.2a | 2.2b |
| Sour aromatic | 1.0a | 1.0a |
| Cardboard/mushroom | ND | 2.2 |
| Fishy | ND | 1.8 |
| Sweet taste | 8.4a | 8.5a |
| Sour taste | 1.7a | 1.6a |
| Metallic | 2.0b | 2.4a |

TABLE 1g-continued

Sensory profile of yogurt at day 56

| Attribute | Dark control | Dairy case |
|---|---|---|
| Comments | | Fishy/metallic aroma, visibly lighter in color, Flavor is muted, 7/7 panelists consistently detected fishy flavor |

Attributes are scored on a 0 to 15 point universal Spectrum ™ intensity scale. Most flavor attributes fall between 0 and 5.
ND—not detected
Means in a row followed by different letters are different (p < 0.05)

At 56 days, yogurts in the lighted dairy case have a distinct fishy aroma and flavor. At 56 days, yogurts stored in the dark did not have fishy aroma and flavor.

FIG. 1 shows the fishy flavor intensity in drinkable yogurts stored in a refrigerated lighted dairy case (700 Lx). At day 28, about half of the trained panel consistently detected fishy flavor in the yogurts. At day 42, all panelists consistently detected fishy flavor.

Figure 2:
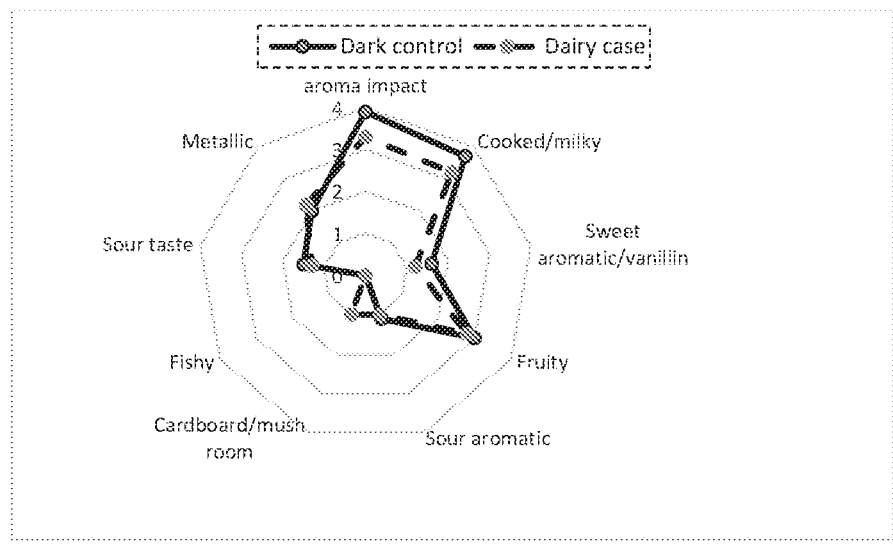
FIG. 2 shows a spider chart of the flavor characteristics of a yogurt drink stored for 14 days in a lighted dairy case. (See Example 1.)

FIG. 2 shows the sensory profiles of yogurt stored at 4 C in the dark and at 4 C in a lighted dairy case (700 Lx) for 14 days. Sweet taste is not included on graphs since values were not different (p>0.05) and the higher scale intensity masks other differences. The blue line is the yogurt stored in dark. The organge line is the yogurt stored in the refrigerated lighted dairy case.

Figure 3:
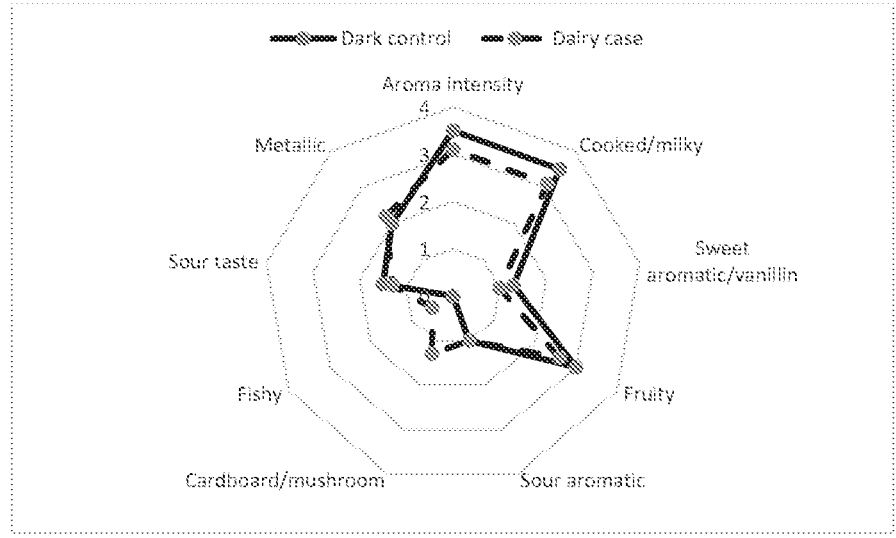
FIG. 3 shows a spider chart of the flavor characteristics of a yogurt drink stored for 28 days in a lighted dairy case. (See Example 1.)

FIG. 3 shows the sensory profiles of yogurt stored at 4 C in the dark and at 4 C in a lighted dairy case (700 Lx) for 28 days. Sweet taste is not included on graphs since values were not different (p>0.05) and the higher scale intensity masks other differences. The blue line is the yogurt stored in dark. The organge line is the yogurt stored in the refrigerated lighted dairy case.

Figure 4:
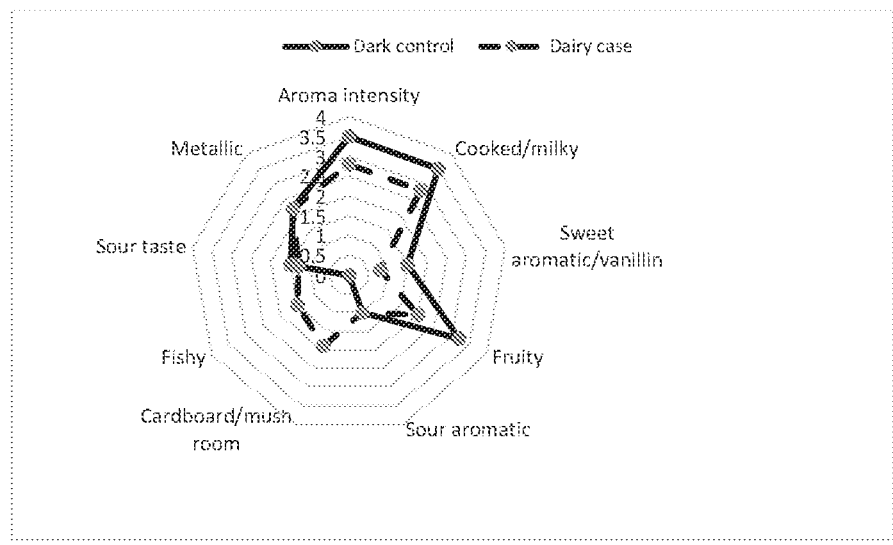
FIG. 4 shows a spider chart of the flavor characteristics of a yogurt drink stored for 42 days in a lighted dairy case. (See Example 1.)

FIG. 4 shows the sensory profiles of yogurt stored at 4 C in the dark and at 4 C in a lighted dairy case (700 Lx) for 42 days. Sweet taste is not included on graphs since values were not different (p>0.05) and the higher scale intensity masks other differences. The blue line is the yogurt stored in dark. The organge line is the yogurt stored in the refrigerated lighted dairy case.

Figure 5:
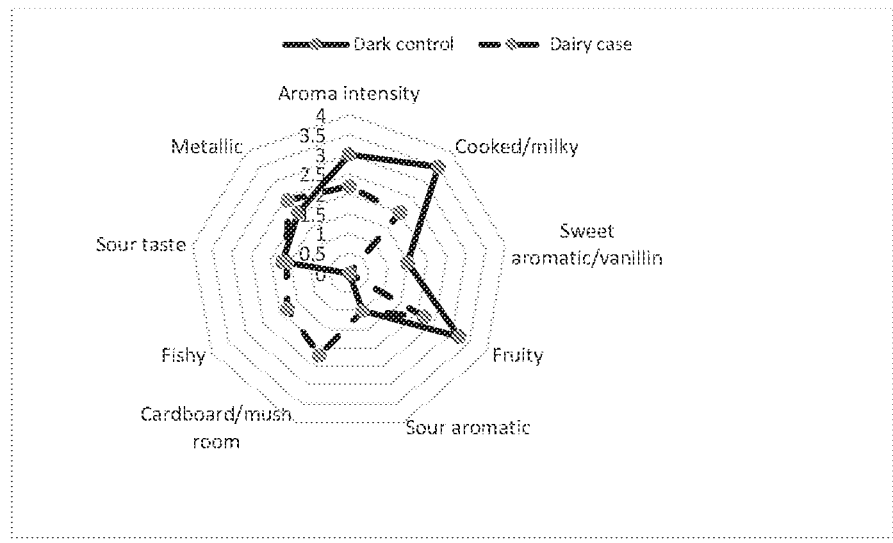
FIG. 5 shows a spider chart of the flavor characteristics of a yogurt drink stored for 56 days in a lighted dairy case. (See Example 1.)
Figure 6:
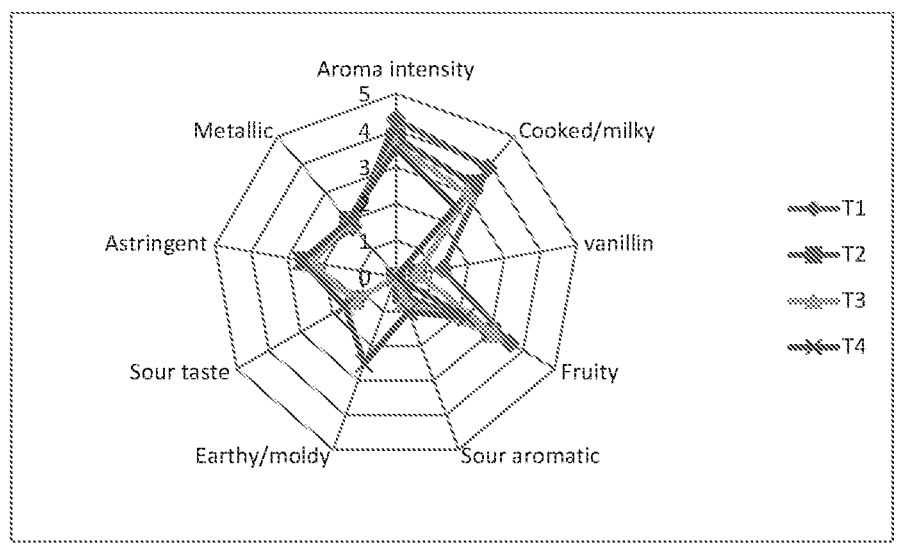
FIG. 6 shows a spider plot of sensory profile of drinkable yogurts across time. Sweet taste is not indicated on graph so that other differences can be visualized. (See Example 10.)
Figure 7:
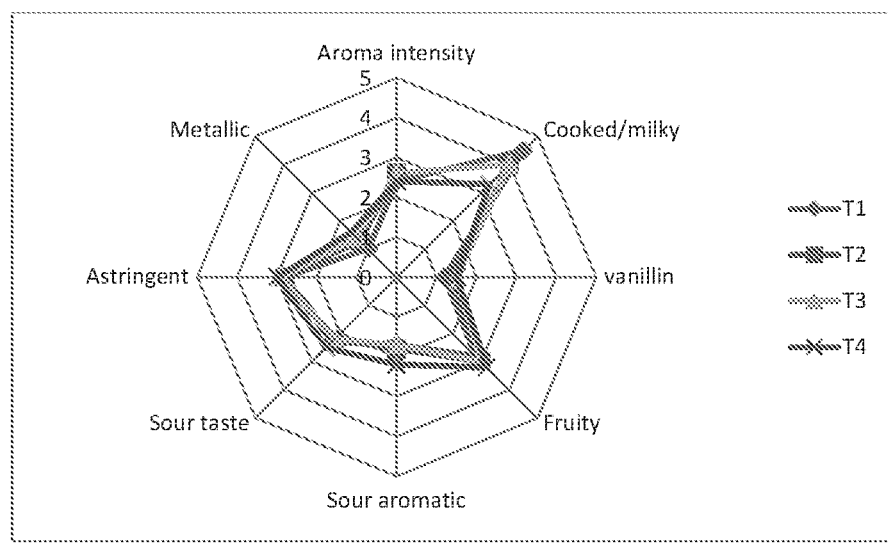
FIG. 7 shows a spider plot of sensory profile of yogurts across time. Sweet taste is not indicated on graph so that other differences can be visualized. (See Example 10.)
Figure 8:
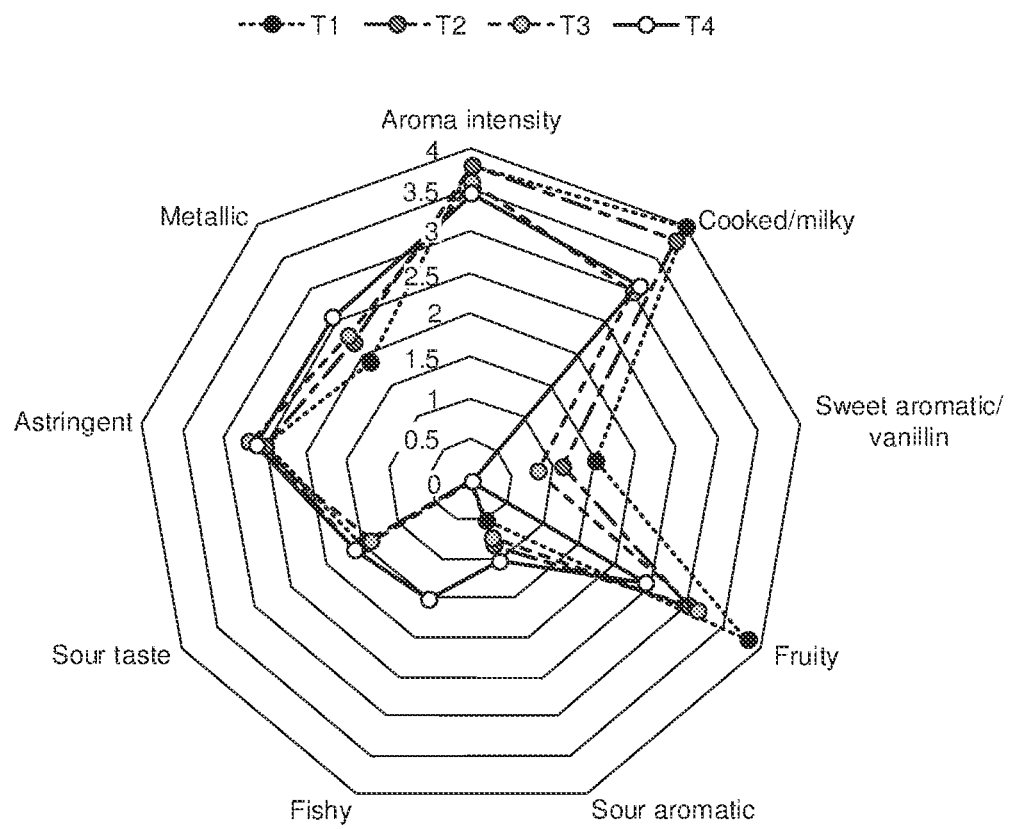
FIG. 8 shows a sensory profile of cherry vanilla yogurts across time. Sweet taste is not indicated on graph so that other differences can be visualized. (See Example 11.)
Figure 9:
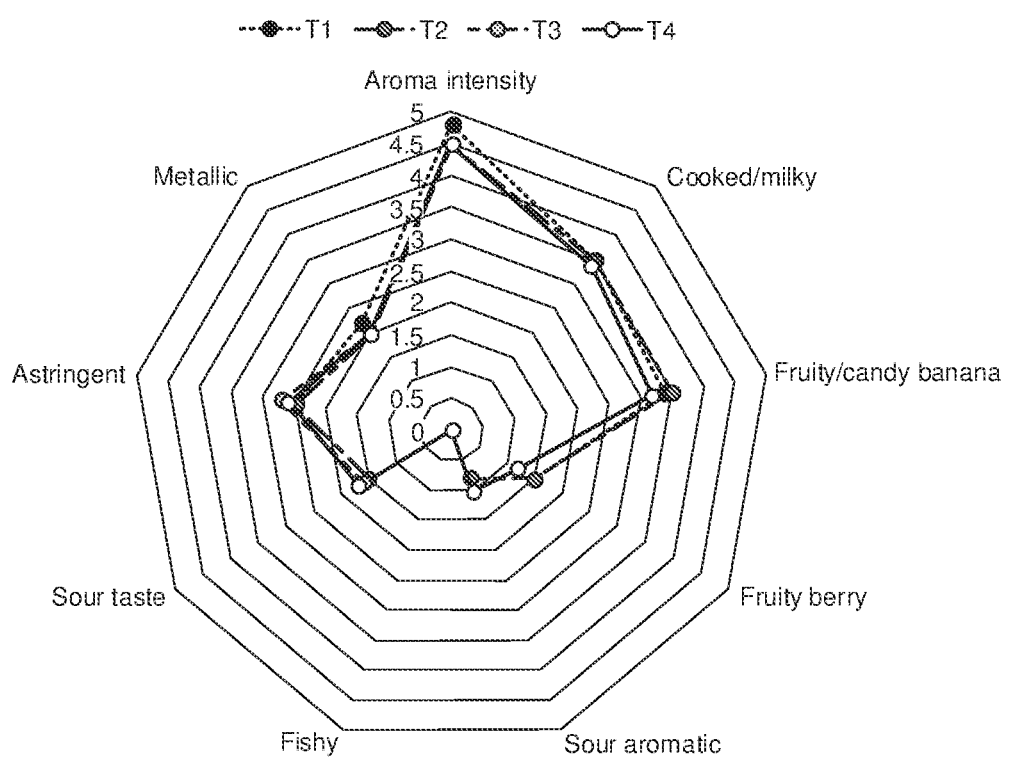
FIG. 9 shows a sensory profile of strawberry banana yogurts across time. Sweet taste is not indicated on graph so that other differences can be visualized. (See Example 11)

FIG. 5 shows the sensory profiles of yogurt stored at 4 C in the dark and at 4 C in a lighted dairy case (700 Lx) for 56 days. Sweet taste is not included on graphs since values were not different (p>0.05) and the higher scale intensity masks other differences. The blue line is the yogurt stored in dark. The organge line is the yogurt stored in the refrigerated lighted dairy case.

Example 10—Sensory Panel Testine of Cherry Vanilla Yogurt and Yogurt Drinks

Cherry vanilla yogurt and cherry vanilla yogurt drinks were received April 5. Yogurts were stored at 4 C per the timepoint structure below.

| April 8, T1 | April 11, T2 | April 15, T3 | April 18 T4 |
|---|---|---|---|

Descriptive sensory and statistical analyses were performed as described in Example 9.

The yogurts tested were formulated as shown in the Table below.

| Ingredient | % of Formulation |
|---|---|
| Whole Milk | 70.24-89.9% |
| Stabilizer Blend (Tapioca Starch, Locust Bean Gum, Pectin, Agar) | 1.2-3.03% |
| Non Fat Dry Milk | 1.4-4.8% |
| Flax Oil (50% ALA) | .11-.95% |
| Algal Oil (40% DHA) | .11-.95% |
| Choline Chloride (74% Choline) | .05-.495% |
| Culture | .001-.04% |
| Antioxidant | .001-.04% |
| Fruit Prep | 9.95-19.95% |

The yogurt drinks tested were formulated as shown in the Table below.

| Ingredient | % of Formulation |
|---|---|
| Whole Milk | 40-60.5% |
| Tapioca Starch | .1-2.05% |
| Milk Protein Concentrate | 1.2-3% |
| Gellan Gum | .01-1.05% |
| Water | 15.5-30% |
| Algal Oil (40% DHA) | .11-.95% |
| Flax Oil (50% ALA) | .11-.95% |
| Choline Chloride (74% Choline) | .05-.495% |
| Antioxidant | .001-.04% |
| Culture | .001-.04% |
| Fruit Prep | 9.95-19.95% |

The results of sensory testing are shown in the following Tables.

TABLE 1

Sensory profile of drinkable yogurts across time

| Attribute | T1 | T2 | T3 | T4 |
|---|---|---|---|---|
| Aroma intensity | 4.3a | 3.8b | 3.6b | 3.5b |
| In-mouth | | | | 2.0 |
| Cooked/milky | 3.9a | 3.3b | 3.0b | 2.5c |
| Sweet aromatic/vanillin | 1.3a | 0.6b | 0.6b | ND |
| Fruity | 3.6a | 3.0b | 3.1b | 2.2c |
| Sour aromatic | 0.5a | 0.5a | 0.7a | 1.0a |
| Earthy/moldy | ND | ND | ND | 2.5 |
| Cardboard/mushroom | ND | ND | ND | ND |
| Fishy | ND | ND | ND | ND |
| Sweet taste | 7.7a | 8.0a | 8.0a | 7.5a |
| Sour taste | 1.2b | 1.3b | 1.3b | 1.6a |
| Astringent | 2.5a | 2.5a | 2.3a | 2.6a |
| Metallic | 1.8a | 2.0a | 2.0a | 2.0a |
| Comments | chalky | chalky | chalky | MOLDY, SPOILED |

Attributes are scored on a 0- to15-point universal Spectrum ™ intensity scale. Most flavor attributes fall between 0 and 5.
Means in a row followed by different letters are different (p < 0.05).
ND—not detected

TABLE 2

Sensory profile of yogurts across time

| Attribute | T1 | T2 | T3 | T4 |
|---|---|---|---|---|
| Aroma intensty | 2.4a | 2.6a | 2.6a | 2.4a |
| In-mouth | | | | |
| Cooked/milky | 4.5a | 4.0b | 4.0b | 3.5b |
| Sweet aromatic/vanillin | 1.2a | 1.4a | 1.5a | 1.5a |
| Fruity | 2.8a | 3.0a | 3.0a | 3.2a |
| Sour aromatic | 1.7b | 1.8b | 1.7b | 2.2a |
| Cardboard/mushroom | ND | ND | ND | ND |
| Fishy | ND | ND | ND | ND |
| Sweet taste | 6.5a | 6.7a | 6.6a | 6.4a |
| Sour taste | 2.3a | 2.2a | 2.2a | 2.5a |

TABLE 2-continued

Sensory profile of yogurts across time

| Attribute | T1 | T2 | T3 | T4 |
|---|---|---|---|---|
| Astringent | 2.8a | 2.8a | 2.9a | 3.0a |
| Metallic | 1.0b | 1.3ab | 1.4ab | 1.6a |
| comments | chalky | chalky | chalky | Chalky, more sour |

Attributes are scored on a 0- to 15-point universal Spectrum ™ intensity scale. Most flavor atributes fall between 0 and 5.
Means in a row followed by different letters are different ($p < 0.05$).
ND—not detected

Example 11—Sensory Panel Testing of Strawberry Banana and Cherry Vanilla Yogurt Drinks Strawberry banana and cherry vanilla yogurt drinks, formulated as shown in Example 10, were received May 22. Yogurts were stored at 4 C and sampled per the timepoint structure below.

| May 24, T1 | May 29, T2 | June 3, T3 | June 7 T4 |
|---|---|---|---|

Descriptive sensory and statistical analyses were performed as described in Example 9.

TABLE 1

Sensory profile of cherry vanilla drinkable yogurts across time

| Attribute | T1 | T2 | T3 | T4 |
|---|---|---|---|---|
| Aroma intensity | 3.8a | 3.8a | 3.6ab | 3.5b |
| In-mouth | | | | |
| Cooked/milky | 4.0a | 3.8b | 3.0b | 3.1b |
| Sweet aromatic/vanillin | 1.5a | 1.1b | 0.8b | ND |
| Fruity | 3.8a | 3.0b | 3.1b | 2.4c |
| Sour aromatic | 0.5b | 0.8ab | 0.7ab | 1.0a |
| Earthy/moldy | ND | ND | ND | ND |
| Cardboard/mushroom | ND | ND | ND | ND |
| Fishy | ND | ND | ND | 1.5 |
| Sweet taste | 7.8a | 7.7a | 7.8a | 7.5a |
| Sour taste | 1.5a | 1.6a | 1.4a | 1.6a |
| Astringent | 2.5a | 2.5a | 2.7a | 2.6a |
| Metallic | 1.9a | 2.2a | 2.3a | 2.6a |
| Comments | Chalky, low oily flavor | Chalky, low oily flavor | Chalky, low oily flavor | LOW FISHY AROMA AND FLAVOR |

Attributes are scored on a 0- to 15-point universal Spectrum ™ intensity scale. Most flavor attributes fall between 0 and 5.
Means in a row followed by different letters are different ($p < 0.05$).
ND—not detected

TABLE 2

Sensory profile of strawberry banana drinkable yogurts across time

| Attribute | T1 | T2 | T3 | T4 |
|---|---|---|---|---|
| Aroma intensity | 4.8a | 4.5a | 4.5a | 4.5a |
| In-mouth | | | | |
| Cooked/milky | 3.5a | 3.5a | 3.4a | 3.4a |
| Fruity/candy banana | 3.4a | 3.5a | 3.2a | 3.2a |
| Fruity berry | 1.5a | 1.5a | 1.2a | 1.2a |
| Sour aromatic | 0.8a | 0.8a | 1.0a | 1.0a |
| Earthy/moldy | ND | ND | ND | ND |
| Cardboard/mushroom | ND | ND | ND | ND |
| Fishy | ND | ND | ND | ND |
| Sweet taste | 7.5a | 7.6a | 7.6a | 7.7a |
| Sour taste | 1.5a | 1.5a | 1.6a | 1.7a |
| Astringent | 2.5a | 2.5a | 2.7a | 2.6a |
| Metallic | 2.2a | 2.0a | 2.0a | 2.0a |

TABLE 2-continued

Sensory profile of strawberry banana drinkable yogurts across time

| Attribute | T1 | T2 | T3 | T4 |
|---|---|---|---|---|
| Comments | Chalky, low oily flavor | Chalky, low oily flavor | Chalky, low oily flavor | Chalky, low oily flavor |

Attributes are scored on a 0 to 15 point universal Spectrum ™ intensity scale. Most flavor attributes fall between 0 and 5.
Means in a row followed by different letters are different ($p < 0.05$).
ND—not detected

Example 12—Sensory Panel Testing of Strawberry Banana and Cherry Vanilla Yogurt Drinks Under Lighted and Light-Shielded Conditions Strawberry banana and cherry vanilla yogurt drinks, formulated as shown in Example 10 and provided in bottles and tubes, were received July 11. Products were assigned to a lighted dairy case or a dark light-shielded box. Yogurts were stored at 4 C and sampled per the timepoint structure below.

Lighted dairy case

| July 11, T1* | July 19, T2 | July 26 T3 | Aug. 2, T4 | Aug. 9 T5 | Aug. 16 T6 |
|---|---|---|---|---|---|

Light shielded (dark)

| July 11, T1* | July 19, T2 | July 26 T3 | Aug 2, T4 | Aug 9 T5 | Aug 16 T6 | Aug 23 T7 | Aug 30 T8 |
|---|---|---|---|---|---|---|---|

*T1 is the same for both storage conditions. This timepoint occurred on receipt.

| Sept. 6, T9 | Sept. 13, T10 |
|---|---|

Descriptive sensory and statistical analyses were performed as described in Example 9.

TABLE 1a

Sensory profile of mixed berry yogurts in bottles across time in the dark

| Attribute | T1 | T2 | T3 | T4 | T5 | T6 | T7 |
|---|---|---|---|---|---|---|---|
| Aroma intensity | 3.9a | 3.8a | 3.0b | 3.0b | 3.4ab | 3.2b | 3.5ab |
| In-mouth | | | | | | | |
| Cooked/milky | 3.7a | 3.8a | 3.5ab | 3.3b | 3.5ab | 3.3b | 3.3b |
| Fruity | 3.0a | 3.0a | 2.7a | 2.9a | 2.8a | 2.7a | 2.7a |
| Sour aromatic | 1.2b | 1.0b | 1.2b | 1.2b | 1.4a | 1.4a | 1.5a |
| Earthy/moldy | ND | ND | ND | ND | ND | ND | ND |
| Cardboard/mushroom | ND | ND | ND | ND | ND | ND | ND |
| Fishy | ND | ND | ND | ND | ND | ND | ND |
| Sweet taste | 5.7a | 5.8a | 5.5a | 5.7a | 5.8a | 5.7a | 5.6a |
| Sour taste | 2.8b | 2.7b | 2.6b | 2.6b | 2.9ab | 3.0a | 3.2a |
| Astringent | 2.9a | 2.9a | 2.8a | 2.8a | 3.0a | 3.0a | 3.0a |
| Metallic | 2.0a | 2.2a | 2.0a | 2.0a | 2.2a | 2.2a | 2.1a |
| Comments | Chalky | Chalky | Chalky | Chalky | chalky | chalky | chalky |

TABLE 1a-continued

Sensory profile of mixed berry yogurts in bottles across time in the dark

| Attribute | T8 | T9 | T10 |
|---|---|---|---|
| Aroma intensity | 3.1b | 3.2b | 3.0b |
| In-mouth | | | |
| Cooked/milky | 3.3b | 3.2b | 3.3b |
| Fruity | 2.8a | 2.8a | 2.6a |
| Sour aromatic | 1.5a | 1.4a | 1.5a |
| Earthy/moldy | ND | ND | ND |
| Cardboard/mushroom | ND | ND | ND |
| Fishy | ND | ND | ND |
| Sweet taste | 5.7a | 5.6a | 5.6a |
| Sour taste | 3.3a | 3.3a | 3.4a |
| Astringent | 3.0a | 3.2a | 3.2a |
| Metallic | 2.2a | 2.2a | 2.3a |
| Comments | chalky | Chalky, sour | Chalky, sour |

Attributes are scored on a 0- to 15-point universal Spectrum ™ intensity scale. Most flavor attributes fall between 0 and 5. Means in a row followed by different letters are different ($p < 0.05$).
ND—not detected TABLE 1b Sensory profile of mixed berry yogurts in bottles across time in a lighted dairy case

| Attribute | T1 | T2 | T3 | T4 | T5 | T6 |
|---|---|---|---|---|---|---|
| Aroma intensity | 3.9a | 3.8a | 3.0b | 3.4ab | 3.4ab | 3.2b |
| In-mouth | | | | | | |
| Cooked/milky | 3.7a | 3.9a | 3.4b | 3.3b | 3.5b | 3.4b |
| Fruity | 3.0a | 3.2a | 2.8ab | 2.9ab | 2.8ab | 2.6b |
| Sour aromatic | 1.2b | 1.0b | 1.4ab | 1.2b | 1.4ab | 1.5a |
| Earthy/moldy | ND | ND | ND | ND | ND | ND |
| Cardboard/mushroom | ND | ND | ND | ND | ND | ND |
| Fishy | ND | ND | ND | ND | ND | ND |
| Sweet taste | 5.7a | 5.6a | 5.4a | 5.6a | 5.8a | 5.7a |
| Sour taste | 2.8a | 2.7a | 2.7a | 2.7a | 2.9a | 3.0a |
| Astringent | 2.9a | 2.7a | 2.8a | 2.9a | 3.0a | 3.0a |
| Metallic | 2.0a | 2.2a | 2.0a | 2.0a | 2.2a | 2.2a |
| Comments | Chalky | Chalky | Chalky | Chalky | chalky | chalky |

Attributes are scored on a 0- to 15-point universal Spectrum ™ intensity scale. Most flavor attributes fall between 0 and 5. Means in a row followed by different letters are different ($p < 0.05$).
ND—not detected
NOTE:
T1 is the same for both storage conditions as it was conducted at time of receipt.

TABLE 2a

Sensory profile of strawberry yogurts in bottles across time in the dark

| Attribute | T1 | T2 | T3 | T4 | T5 | T6 | T7 |
|---|---|---|---|---|---|---|---|
| Aroma intensity | 4.0a | 3.8a | 3.2b | 3.0b | 3.4b | 3.4b | 3.3b |
| In-mouth | | | | | | | |
| Cooked/milky | 3.8a | 3.8a | 3.5ab | 3.3b | 3.5ab | 3.2b | 3.3b |
| Fruity | 2.8a | 3.0a | 2.7a | 2.9a | 2.8a | 2.7a | 2.4b |
| Sour aromatic | 1.2b | 1.4b | 1.4b | 1.5ab | 1.6ab | 1.6ab | 1.7a |
| Vitamin | 2.2a | 2.4a | 2.2a | 2.2a | 2.0a | 2.2a | 2.3a |
| Cardboard/mushroom | ND | ND | ND | ND | ND | ND | ND |
| Fishy | ND | ND | ND | ND | ND | ND | ND |
| Sweet taste | 5.5a | 5.8a | 5.7a | 5.7a | 5.8a | 5.7a | 5.6a |
| Sour taste | 3.3a | 3.0b | 3.2ab | 3.2ab | 3.2ab | 3.2ab | 3.4a |
| Astringent | 2.9b | 2.9b | 2.9b | 2.8b | 3.1a | 3.0ab | 3.3a |
| Metallic | 2.0a | 2.2a | 2.0a | 2.0a | 2.2a | 2.2a | 2.1a |
| Comments | Chalky | Chalky | Chalky | Chalky | chalky | chalky | chalky |

| Attribute | T8 | T9 | T10 |
|---|---|---|---|
| Aroma intensity | 3.3b | 3.3b | 3.3b |
| In-mouth | | | |
| Cooked/milky | 3.2b | 3.2b | 3.3b |
| Fruity | 2.7a | 2.5ab | 2.2b |
| Sour aromatic | 1.8a | 1.8a | 1.7a |
| Vitamin | 2.4a | 2.4a | 2.3a |
| Cardboard/mushroom | ND | 1.0 | 0.8 |
| Fishy | ND | ND | ND |
| Sweet taste | 5.6a | 5.7a | 5.6a |
| Sour taste | 3.5a | 3.5a | 3.6a |
| Astringent | 3.4a | 3.4a | 3.3a |
| Metallic | 2.3a | 2.3a | 2.2a |
| Comments | chalky | Chalky, sour | Chalky, sour |

Attributes are scored on a 0- to 15-point universal Spectrum ™ intensity scale. Most flavor attributes fall between 0 and 5. Means in a row followed by different letters are different ($p < 0.05$).
ND—not detected TABLE 2b Sensory profile of strawberry yogurts in bottles across time in a lighted dairy case

| Attribute | T1 | T2 | T3 | T4 | T5 | T6 |
|---|---|---|---|---|---|---|
| Aroma intensity | 4.0a | 3.8a | 3.2b | 3.0b | 3.2b | 3.4b |
| In-mouth | | | | | | |
| Cooked/milky | 3.8a | 3.7a | 3.6ab | 3.3b | 3.1b | 3.0b |
| Fruity | 2.8a | 2.9a | 2.8a | 3.0a | 2.5b | 2.3b |
| Sour aromatic | 1.2b | 1.3b | 1.5ab | 1.7a | 1.7a | 1.7a |
| Vitamin | 2.2a | 2.2a | 2.1a | 2.0a | 2.2a | 2.2a |
| Cardboard/mushroom | ND | ND | ND | ND | ND | ND |
| Fishy | ND | ND | ND | ND | ND | ND |
| Sweet taste | 5.5a | 5.6a | 5.7a | 5.7a | 5.8a | 5.7a |
| Sour taste | 3.3a | 3.2a | 3.3a | 3.3a | 3.3a | 3.3a |
| Astringent | 2.9a | 2.9a | 3.0a | 2.8a | 3.2a | 3.0a |
| Metallic | 2.0a | 2.2a | 2.0a | 2.2a | 2.4a | 2.5a |
| Comments | Chalky | Chalky | Chalky | Chalky | Chalky, oily | Chalky, oily, muted flavor |

Attributes are scored on a 0- to 15-point universal Spectrum ™ intensity scale. Most flavor attributes fall between 0 and 5. Means in a row followed by different letters are different ($p < 0.05$).
ND—not detected
NOTE:
T1 is the same for both storage conditions as it was conducted at time of receipt.

TABLE 3a

Sensory profile of cherry vanilla yogurts in tubes across time in the dark

| Attribute | T1 | T2 | T3 | T4 | T5 | T6 | T7 |
|---|---|---|---|---|---|---|---|
| Aroma intensity | 4.3a | 3.8a | 3.2b | 3.0b | 3.1b | 3.4b | 3.3b |
| In-mouth | | | | | | | |
| Cooked/milky | 4.0a | 3.8a | 3.7a | 3.5ab | 3.3b | 3.2b | 3.0b |
| Sweet aromatic/vanillin | 2.7a | 2.5a | 2.5a | 2.5a | 2.4a | 2.5a | 2.4ab |
| Fruity | 3.8a | 3.8a | 3.4b | 3.3b | 2.8c | 3.0bc | 2.6c |
| Sour aromatic | 0.8c | 1.0bc | 1.3b | 1.3b | 1.6a | 1.6a | 1.8a |
| Cardboard/mushroom | ND | ND | ND | ND | ND | ND | ND |
| Fishy | ND | ND | ND | ND | ND | ND | ND |
| Sweet taste | 6.4a | 6.2a | 6.0a | 6.0a | 6.2a | 6.2a | 6.2a |
| Sour taste | 2.0b | 2.1b | 2.3b | 2.3b | 2.2b | 2.5a | 2.4ab |
| Astringent | 2.5ab | 2.4b | 2.8a | 2.5ab | 2.7a | 2.7a | 2.9a |
| Metallic | 2.0b | 2.0b | 2.0b | 2.0b | 2.1b | 2.1b | 2.0b |
| Comments | | | | | | | |

| Attribute | T8 | T9 | T10 |
|---|---|---|---|
| Aroma intensity | 3.1b | 3.2b | 3.0b |
| In-mouth | | | |
| Cooked/milky | 3.0b | 3.0b | 3.0b |
| Sweet aromatic/vanillin | 2.4ab | 2.2b | 2.1b |
| Fruity | 2.9c | 2.5c | 2.4c |
| Sour aromatic | 1.6a | 1.6a | 1.5a |
| Cardboard/mushroom | ND | ND | ND |
| Fishy | ND | 1.2a | 1.3a |
| Sweet taste | 6.2a | 6.0a | 6.0a |
| Sour taste | 2.6a | 2.5a | 2.7a |
| Astringent | 3.0a | 3.0a | 2.9a |
| Metallic | 2.3a | 2.4a | 2.5a |
| Comments | | fishy | fishy |

Attributes are scored on a 0- to 15-point universal Spectrum ™ intensity scale. Most flavor attributes fall between 0 and 5. Means in a row followed by different letters are different ($p < 0.05$).
ND—not detected

TABLE 3b

Sensory profile of cherry vanilla yogurts in tubes across time in a lighted dairy case

| Attribute | T1 | T2 | T3 | T4 | T5 | T6 |
|---|---|---|---|---|---|---|
| Aroma intensity | 4.3a | 3.8a | 3.2b | 3.3b | 3.0b | 3.0b |
| In-mouth | | | | | | |
| Cooked/milky | 4.0a | 3.9a | 3.6a | 3.5ab | 3.1b | 3.0b |
| Sweet aromatic/vanillin | 2.7a | 2.5a | 2.6a | 2.7a | 2.2b | 2.1b |
| Fruity | 3.8a | 3.8a | 3.5ab | 3.5ab | 3.4ab | 3.1b |
| Sour aromatic | 0.8b | 1.0b | 1.2b | 1.1b | 1.6a | 1.7a |
| Cardboard/mushroom | ND | ND | ND | ND | ND | 1.2 |
| Fishy | ND | ND | ND | ND | ND | 1.0 |
| Sweet taste | 6.4a | 6.3a | 6.4a | 6.3a | 6.3a | 6.3a |
| Sour taste | 2.0b | 2.1b | 2.2b | 2.4ab | 2.5a | 2.6a |
| Astringent | 2.5a | 2.5a | 2.7a | 2.5a | 2.9a | 2.7a |
| Metallic | 2.0b | 2.0b | 2.0b | 2.0b | 2.2b | 2.6a |
| Comments | | | | | muted | Fishy |

Attributes are scored on a 0- to 15-point universal Spectrum ™ intensity scale. Most flavor attributes fall between 0 and 5. Means in a row followed by different letters are different ($p < 0.05$).
ND—not detected NOTE:
T1 is the same for both storage conditions as it was conducted at time of receipt.

TABLE 4a

Sensory profile of strawberry banana yogurts in tubes across time in the dark

| Attribute | T1 | T2 | T3 | T4 | T5 | T6 | T7 |
|---|---|---|---|---|---|---|---|
| Aroma intensity | 4.5a | 3.9a | 3.9a | 4.2a | 3.9a | 4.2a | 3.5b |
| In-mouth | | | | | | | |
| Cooked/milky | 3.5a | 3.5a | 3.4a | 3.5a | 3.5a | 3.3a | 3.2a |
| Candy banana | 3.0a | 2.9a | 2.8a | 3.0a | 2.9a | 2.7a | 2.7a |
| Fruity | 2.3a | 2.2a | 2.4a | 2.3a | 2.2a | 2.1ab | 2.0b |
| Vitamin | 1.6a | 1.6a | 1.6a | 1.6a | 1.4a | 1.6a | 1.6a |
| Sour aromatic | 1.0b | 1.0b | 1.0b | 1.0b | 1.2ab | 1.4a | 1.3ab |
| Cardboard/mushroom | ND | ND | ND | ND | ND | ND | ND |
| Fishy | ND | ND | ND | ND | ND | ND | ND |
| Sweet taste | 6.5a | 6.6a | 6.4a | 6.6a | 6.6a | 6.5a | 6.6a |
| Sour taste | 2.4a | 2.5a | 2.4a | 2.5a | 2.5a | 2.5a | 2.7a |
| Astringent | 2.5b | 2.4b | 2.4b | 2.4b | 2.4b | 2.4b | 2.7b |
| Metallic | 2.0b | 2.0b | 2.0b | 2.0b | 2.0b | 2.0b | 2.0b |
| Comments | | | | | | | |

| Attribute | T8 | T9 | T10 |
|---|---|---|---|
| Aroma intensity | 3.5b | 3.3b | 3.5b |
| In-mouth | | | |
| Cooked/milky | 3.2a | 3.3a | 3.3a |
| Candy banana | 2.6a | 2.7a | 2.6a |
| Fruity | 2.0b | 2.0b | 1.9b |
| Vitamin | 1.4a | 1.5a | 1.7a |
| Sour aromatic | 1.4a | 1.4a | 1.6a |
| Cardboard/mushroom | ND | ND | ND |
| Fishy | ND | ND | 1.0 |
| Sweet taste | 6.6a | 6.5a | 6.6a |
| Sour taste | 2.6a | 2.8a | 2.7a |
| Astringent | 2.8a | 2.8a | 2.8a |
| Metallic | 2.0b | 2.0b | 2.4a |
| Comments | | | fishy |

Attributes are scored on a 0- to 15-point universal Spectrum ™ intensity scale. Most flavor attributes fall between 0 and 5. Means in a row followed by different letters are different ($p < 0.05$).
ND—not detected TABLE 4b Sensory profile of strawberry banana yogurts in tubes across time in a lighted dairy case

| Attribute | T1 | T2 | T3 | T4 | T5 | T6 |
|---|---|---|---|---|---|---|
| Aroma intensity | 4.5a | 3.9b | 3.9b | 3.7b | 3.8b | 3.8b |
| In-mouth | | | | | | |
| Cooked/milky | 3.5a | 3.6a | 3.5a | 3.5a | 3.3ab | 3.0b |
| Candy banana | 3.0a | 2.7a | 2.7a | 2.9a | 2.6ab | 2.0b |
| Fruity | 2.0a | 2.0a | 2.4a | 2.0a | 2.0a | 2.0a |
| Vitamin | 1.6a | 1.4a | 1.4a | 1.6a | 1.4a | 1.7a |
| Sour aromatic | 1.0b | 1.0b | 1.1b | 1.0b | 1.5a | 1.4a |
| Cardboard/mushroom | ND | ND | ND | 1.5 | ND | ND |
| Fishy | ND | ND | ND | ND | ND | 1.4 |
| Sweet taste | 6.5a | 6.4a | 6.5a | 6.6a | 6.6a | 6.5a |
| Sour taste | 2.4a | 2.5a | 2.5a | 2.5a | 2.7a | 2.7a |
| Astringent | 2.5a | 2.4a | 2.4a | 2.4a | 2.6a | 2.7a |
| Metallic | 2.0b | 2.0b | 2.0b | 2.0b | 2.6a | 2.5a |
| Comments | | | | Muted, stale | Fishy, Color changed | Fishy, Color changed |

Attributes are scored on a 0 to 15 point universal Spectrum ™ intensity scale. Most flavor attributes fall between 0 and 5. Means in a row followed by different letters are different ($p < 0.05$).
ND—not detected
NOTE:
T1 is the same for both storage conditions as it was conducted at time of receipt Key Findings 1. Mixed berry yogurts in bottles performed well across the storage time in the dark and in the lighted dairy case. Changes with storage were noted but were consistent between both storage conditions.

Strawberry yogurts in bottles performed well across the storage time in the dark and in the lighted dairy case. At the final two timepoints in the lighted case (days 35 and 42, T5 and T6), an oily note (not fishy) and muted overall flavor were noted.

Cherry vanilla yogurts in tubes performed well across the storage time in the dark through day 56. Low fishy flavors were detected at days 63 and 70. In the lighted dairy case, a low fishy flavor was detected at day 42 (T6).

Strawberry banana yogurts in tubes performed well across the storage time in the dark through day 63. A low fishy flavor was detected by day 70. In the lighted dairy case, a low fishy flavor was detected at days 35 and 42 (T5 and T6).

Example 13—Preparation of Apple Sauce, Cinnamon Apple Sauce, and Strawberry Apple Sauce Apple Sauce, cinnamon apple sauce and strawberry apple sauce were preparing by combining the ingredients in the table below.

TABLE 1

Apple Sauce

| Ingredients | % of Formulation by weight |
|---|---|
| Apple Base (e.g., 87.5-95% Apple puree and 5.5-10% Apple puree concentrate) | 87.5-99% |
| Omega-3 fatty acid powder | 0.5-1.95%* |
| Choline Chloride (74% Choline) | 0.11-0.25% |
| Mixed tocopherols (0.07%) (Antioxidant) | 0.01-0.05% |
| Rosemary extract | 0.01-0.05% |

TABLE 2

Cinnamon Apple Sauce

| Ingredients | % of Formulation by weight |
|---|---|
| Apple Cinnamon Base (e.g., 85-92.5% Apple puree, 1.15-3.3% Banana puree, 4.5-11.5% Apple puree concentrate, and 0.01-0.25% Cinnamon) | 87.5-99% |
| Omega-3 fatty acid powder | 0.5-1.95%* |
| Choline Chloride (74% Choline) | 0.11-0.25% |
| Mixed tocopherols (0.07%) (Antioxidant) | 0.01-0.05% |
| Rosemary extract | 0.01-0.05% |

TABLE 3

Strawberry Apple Sauce

| Ingredients | % of Formulation by weight |
|---|---|
| Strawberry Apple Base (e.g.; 68-81.5% Apple puree; 10-25% Strawberry puree, 1.15-4.5% Banana puree, 0.15-1.25% Blackberry puree, and 10.75-19.5% Apple puree concentrate) | 87.5-99% |
| Omega-3 fatty acid powder | 0.5-1.95%* |
| Choline Chloride (74% Choline) | 0.11-0.25% |
| Mixed tocopherols (0.07%) (Antioxidant) | 0.01-0.05% |
| Rosemary extract | 0.01-0.05% |

In some embodiments, the formulation given in the Table above can include 0.01-0.5% ascorbic acid.

The ingredients in Tables 1, 2, and 3 were purchased from commercial sources. The omega-3 fatty acid powder, at 1.10% provided between about 0.9 to about 1.6 mg DHA per gram of food product (here, apple sauce) and about 0.2 to about 0.5 mg EPA per gram of food product. The ingredients were weighed and mixed in a mixer to prepare puree A. The pH of puree A was determined to ensure that the pH was below 4.0 or below. Next, puree A was heated to a temperature of between 190 F-193° F. and hot filled into pouches. The filled pouches were held at 190 F for 5 minutes to prepare the apple sauce. The Brix value of the apple base (apple puree) was greater than 12. The omega-3 fatty acid powder is an encapsulated fatty acids that provides both DHA and EPA. The powder is about 30% polyunsaturated fatty acids (PUFA) by dry weight. Thus 1.1 grams of the omega-3 fatty acid powder provides about 330 mg of PUFAs per 100 grams of apple sauce. The amount of choline chloride, 0.18%, provides between about 180 mg of choline chloride per 100 grams of apple sauce, and about 130 mg of choline per 100 grams of the apple sauce (depending on processing losses). Rosemary extract is a natural preservative.

Example 14—Accelerated Shelf Life Study of the Apple Sauces of Example 1

The apple sauces of example 1 were tested in accelerated shelf life studies. The apple sauces were prepared and hot filled into pouches exposed to 70° F. and 90° F. for 16 weeks and evaluated organoleptically at day 0, and weeks 3, 6, 9 and 16. The Table below provides the results.

wherein the nutritionally enhanced food composition can be stored without refrigeration or freezing for at least 4 weeks.

Product name: Original - Apple sauce, Apple Cinnamon, Apple strawberry
Description: Sensory Evaluation
Start Date: Mar. 1, 2019
Product storage temperature: 70 F. - considered Ambient Storage. 90 F. - Hot Box (2x accelerated)

| | | | Analysis | | | | |
|---|---|---|---|---|---|---|---|
| | | | Organoleptic Evaluation- Appearance | Organoleptic Evaluation- Aroma | Organoleptic Evaluation- Flavor | Organoleptic Evaluation- Texture | Organoleptic Evaluation- Conclusion |
| | | | | | Method | | |
| | | | Sensory evaluation comparing product to control sample (stored at refrigeration temperatures) | Sensory evaluation comparing product to control sample (stored at refrigeration temperatures) | Sensory evaluation comparing product to control sample (stored at refrigeration temperatures) | Sensory evaluation comparing product to control sample (stored at refrigeration temperatures) | Sensory evaluation comparing product to control sample (stored at refrigeration temperatures) |
| | | | | | Scale | | |
| Sample name | Sample Week | Storage conditions | 1 - very different from control/ not acceptable 5 - same as control | 1 - very different from control/ not acceptable 5 - same as control | 1 - very different from control/ not acceptable 5 - same as control | 1 - very different from control/ not acceptable 5 - same as control | |
| | | | | | Results | | |
| Original - Apple sauce | Day 0 | 70 F. | Light - applesauce color | Fresh apple aroma | Fresh apple flavor, no offnotes | Pulpy, runny | Baseline |
| Apple Cinnamon | Day 0 | 70 F. | Brown specs of cinnamon | Fresh apple aroma | Fresh apple flavor, strong cinnamon, no offnotes | Pulpy, runny | Baseline |
| Apple strawberry | Day 0 | 70 F. | Pale pink color | Fresh apple aroma | Fresh apple flavor, slight tartness from strawberry, no offnotes | Pulpy, runny | Baseline |
| Original - Apple sauce | Week 3 | 90 F. | 5 | 5 | 5 | 5 | Acceptable |
| Apple Cinnamon | Week 3 | 90 F. | 5 | 5 | 5 | 5 | Acceptable |
| Apple strawberry | Week 3 | 90 F. | 4 | 5 | 5 | 5 | Acceptable |
| Original - Apple sauce | Week 6 | 90 F. | 5 | 5 | 5 | 5 | Acceptable |
| Apple Cinnamon | Week 6 | 90 F. | 5 | 5 | 5 | 5 | Acceptable |
| Apple strawberry | Week 6 | 90 F. | 4 | 5 | 5 | 5 | Acceptable |
| Original - Apple sauce | Week 9 | 90 F. | 5 | 5 | 5 | 5 | Acceptable |
| Original - Apple sauce | Week 9 | 70 F. | 5 | 5 | 5 | 5 | Acceptable |
| Apple Cinnamon | Week 9 | 90 F. | 5 | 5 | 5 | 5 | Acceptable |
| Apple Cinnamon | Week 9 | 70 F. | 5 | 5 | 5 | 5 | Acceptable |
| Apple strawberry | Week 9 | 90 F. | 4- Notice color changes | 5 | 4- Flavor slightly acidic as compared to control | 5 | Acceptable |
| Apple strawberry | Week 9 | 70 F. | 5 | 5 | 5 | 5 | Acceptable |
| Original - Apple sauce | Week 16 | 90 F. | 4 | 5 | 5 | 5 | Acceptable |
| Original - Apple sauce | Week 16 | 70 F. | 5 | 5 | 5 | 5 | Acceptable |
| Apple Cinnamon | Week 16 | 90 F. | 5 | 5 | 5 | 5 | Acceptable |
| Apple Cinnamon | Week 16 | 70 F. | 5 | 5 | 5 | 5 | Acceptable |
| Apple strawberry | Week 16 | 90 F. | 3- Sample color brown | 4 | 4- Flavor dull. No noticeable strawberry | 5 | Not- Acceptable. Color and flavor both were affected significantly. |

What is claimed is:

1. A nutritionally enhanced food composition that is ready for consumption and is fortified with a form of choline that provides between 0.75 mg/g and 5 mg/g free choline, between 0.25 mg/g and 5 mg/g omega-3 fatty acid, and an antioxidant,
wherein the nutritionally enhanced food composition is a fruit or vegetable preparation comprising no added protein,
the form of choline comprising a choline salt or phosphotidyl choline,
the omega-3 fatty acid comprising DHA in combination with ALA or EPA, and
the antioxidant selected from the group consisting of tocopherols, rosemary extract, and vitamin C, and 2. The nutritionally enhanced food composition of claim 1, wherein the peroxide value of the food composition is less than 50 mEq, less than 40 mEq, less than 35 mEq, less than 30 mEq, less than 25 mEq, less than 20 mEq, less than 15 mEq, less than 10 mEq, or less than 5 mEq.

3. The nutritionally enhanced food composition of claim 1, wherein the form of choline comprises choline salt, and the omega-3 fatty acid comprises DHA and ALA.

4. The nutritionally enhanced food composition of claim 1, wherein the nutritionally enhanced food composition comprises a probiotic or an active culture, optionally wherein the probiotic or active culture comprises *Lactobacillus*, *Bifidobacterium*, *Saccharomyces*, *Enterococcus*, *Streptococcus*, *Pediococcus*, *Leuconostoc*, or *Bacillus*.

5. The nutritionally enhanced food composition of claim 1, wherein the form of choline comprises a choline salt at a concentration of up to 4 mg/g, up to 3.5 mg/g, up to 3 mg/g, up to 2.5 mg/g, up to 2 mg/g, up to 1.75 mg/g, up to 1.5 mg/g, up to 1.25 mg/g, and up to 1 mg/g.

6. The nutritionally enhanced food composition of claim 1, wherein the amount of the omega-3 fatty acid is between 0.25 mg/g and 4 mg/g, between 0.25 mg/g and 3.5 mg/g, between 0.25 mg/g and 3 mg/g, between 0.25 mg/g and 2.5 mg/g, between 0.25 mg/g and 2 mg/g, between 0.25 mg/g and 1.75 mg/g, between 0.25 mg/g and 1.5 mg/g, between 0.25 mg/g and 1.25 mg/g, and between 0.25 mg/g and 1 mg/g.

7. The nutritionally enhanced food composition of claim 1, wherein the choline salt is selected from the group consisting of choline acetate, choline bicarbonate, choline chloride, choline citrate, choline bitartrate, and choline lactate.

8. The nutritionally enhanced food composition of claim 1, wherein the omega-3 fatty acid is encapsulated.

9. The nutritionally enhanced food composition of claim 1, wherein the nutritionally enhanced food composition comprises iron.

10. The nutritionally enhanced food composition of claim 9, wherein the iron is encapsulated.

11. The nutritionally enhanced food composition of claim 1, wherein the nutritionally enhanced food composition comprises a probiotic or an active culture, wherein the probiotic or active culture comprises *Lactobacillus, Bifidobacterium, Saccharomyces, Enterococcus, Streptococcus, Pediococcus, Leuconostoc*, or *Bacillus*.

12. The nutritionally enhanced food composition of claim 1, wherein the choline comprises a choline salt at a concentration of between 0.75 mg/g and 2 mg/g.

13. The nutritionally enhanced food composition of claim 1, wherein the omega-3 fatty acid comprises omega-3 fatty acid at a concentration of between 0.25 mg/g and 1 mg/g.

\* \* \* \* \*